United States Patent  
Cormie et al.

(10) Patent No.: US 11,785,291 B2
(45) Date of Patent: *Oct. 10, 2023

(54) CONTENT-MODIFICATION SYSTEM WITH FEATURE FOR DETECTING AND RESPONDING TO CONTENT MODIFICATIONS BY TUNER DEVICES

(71) Applicant: Roku, Inc., San Jose, CA (US)

(72) Inventors: Steven Michael Cormie, Cambridge (GB); Brian Patrick Jentz, Buxton (GB); Stefanos Christakis Liassides, Cardiff (GB)

(73) Assignee: Roku, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/981,868

(22) Filed: Nov. 7, 2022

(65) Prior Publication Data

US 2023/0064828 A1  Mar. 2, 2023

Related U.S. Application Data

(63) Continuation of application No. 17/162,490, filed on Jan. 29, 2021, now Pat. No. 11,533,533.

(Continued)

(51) Int. Cl.
*H04N 21/44* (2011.01)
*H04N 21/458* (2011.01)
(Continued)

(52) U.S. Cl.
CPC ..... *H04N 21/44016* (2013.01); *G06T 1/0021* (2013.01); *G06V 40/1365* (2022.01);
(Continued)

(58) Field of Classification Search
None
See application file for complete search history.

(56) References Cited

U.S. PATENT DOCUMENTS 6,160,989 A  12/2000  Hendricks et al.
6,463,585 B1  10/2002  Hendricks et al.
(Continued)

FOREIGN PATENT DOCUMENTS

KR  101471420 B1  12/2014
KR  20150109552 A  10/2015
KR  20200015831 A  2/2020

OTHER PUBLICATIONS

International Search Report and Written Opinion, dated Jun. 11, 2021, in International Patent Application No. PCT/US2021/018974.

(Continued)

*Primary Examiner* — An Son P Huynh
(74) *Attorney, Agent, or Firm* — Sterne, Kessler, Goldstein & Fox P.L.L.C.

(57) ABSTRACT

In one aspect, a method includes identifying a group of multiple content-presentation devices that are tuned to the same channel and that are each scheduled to perform, at a modification start-time, a respective content-modification operation that comprises modifying a modifiable content-segment in connection with an upcoming content-modification opportunity on the channel. The method also includes determining that, after the modification start-time, at least a subgroup of the group of content-presentation devices have detected a mismatch between reference fingerprint data representing the modifiable content-segment and query fingerprint data representing content received by at least the subgroup of content-presentation devices. The method also includes determining that at least the subgroup of content-presentation devices are connected to tuner devices associated with the same content distributor and, in response to determining that at least the subgroup of content-presentation devices are connected to tuner devices associated with the same content distributor, performing an action.

20 Claims, 13 Drawing Sheets

Related U.S. Application Data

(60) Provisional application No. 63/007,339, filed on Apr. 8, 2020.

(51) Int. Cl.
| | |
|---|---|
| *H04N 21/442* | (2011.01) |
| *H04N 21/845* | (2011.01) |
| *H04N 21/24* | (2011.01) |
| *H04N 21/258* | (2011.01) |
| *H04N 21/262* | (2011.01) |
| *H04N 21/431* | (2011.01) |
| *H04N 21/8358* | (2011.01) |
| *G06T 1/00* | (2006.01) |
| *H04N 21/266* | (2011.01) |
| *G06V 40/12* | (2022.01) |
| *H04N 21/234* | (2011.01) |

(52) U.S. Cl.
CPC ... *H04N 21/23424* (2013.01); *H04N 21/2407* (2013.01); *H04N 21/25816* (2013.01); *H04N 21/25841* (2013.01); *H04N 21/262* (2013.01); *H04N 21/266* (2013.01); *H04N 21/431* (2013.01); *H04N 21/44204* (2013.01); *H04N 21/458* (2013.01); *H04N 21/8358* (2013.01); *H04N 21/8456* (2013.01)

(56) References Cited

U.S. PATENT DOCUMENTS

| | | | |
|---|---|---|---|
| 6,615,039 | B1 | 9/2003 | Eldering |
| 6,756,997 | B1 | 6/2004 | Ward et al. |
| 6,799,326 | B2 | 9/2004 | Boylan et al. |
| 7,359,952 | B2 | 4/2008 | Doemling et al. |
| 7,478,414 | B1 | 1/2009 | Glusker et al. |
| 7,949,565 | B1 | 5/2011 | Eldering et al. |
| 8,046,801 | B2 | 10/2011 | Ellis et al. |
| 9,060,208 | B2 | 6/2015 | Rieger et al. |
| 9,098,868 | B1 | 8/2015 | Issa et al. |
| 9,510,044 | B1 | 11/2016 | Pereira et al. |
| 9,888,268 | B2 | 2/2018 | An et al. |
| 9,906,827 | B2 | 2/2018 | Riedl |
| 10,277,944 | B2 | 4/2019 | Venetucci et al. |
| 10,958,700 | B1 | 3/2021 | Hassler |
| 11,159,849 | B2 | 10/2021 | Lee et al. |
| 11,343,565 | B2 | 5/2022 | Cormie et al. |
| 2002/0104083 | A1 | 8/2002 | Hendricks et al. |
| 2002/0144262 | A1 | 10/2002 | Plotnick et al. |
| 2002/0146123 | A1 | 10/2002 | Tian |
| 2002/0178447 | A1 | 11/2002 | Plotnick et al. |
| 2004/0189873 | A1 | 9/2004 | Konig et al. |
| 2005/0149964 | A1 | 7/2005 | Rosenberg |
| 2005/0213826 | A1 | 9/2005 | Neogi |
| 2006/0249569 | A1 | 11/2006 | Jain |
| 2006/0287912 | A1 | 12/2006 | Raghuvamshi |
| 2006/0287915 | A1 | 12/2006 | Boulet et al. |
| 2009/0043659 | A1 | 2/2009 | Lee |
| 2009/0044246 | A1 | 2/2009 | Sheehan et al. |
| 2009/0158096 | A1 | 6/2009 | Ali et al. |
| 2010/0138290 | A1 | 6/2010 | Zschocke et al. |
| 2010/0269128 | A1 | 10/2010 | Gordon |
| 2011/0069940 | A1 | 3/2011 | Shimy et al. |
| 2011/0162008 | A1 | 6/2011 | Aldrey et al. |
| 2012/0078894 | A1 | 3/2012 | Jiang et al. |
| 2012/0117584 | A1 | 5/2012 | Gordon |
| 2012/0254910 | A1 | 10/2012 | Donoghue et al. |
| 2012/0254911 | A1 | 10/2012 | Doe |
| 2013/0027613 | A1 | 1/2013 | Kim et al. |
| 2013/0031582 | A1 | 1/2013 | Tinsman et al. |
| 2013/0173765 | A1 | 7/2013 | Korbecki |
| 2013/0205330 | A1 | 8/2013 | Sinha et al. |
| 2014/0002749 | A1 | 1/2014 | Pora et al. |
| 2014/0068692 | A1 | 3/2014 | Archibong et al. |
| 2015/0172737 | A1 | 6/2015 | Lechner et al. |
| 2015/0181268 | A1 | 6/2015 | Navin et al. |
| 2015/0373407 | A1 | 12/2015 | Vondersaar |
| 2016/0234550 | A1 | 8/2016 | Jung et al. |
| 2016/0249115 | A1 | 8/2016 | Lincke |
| 2016/0316262 | A1 | 10/2016 | Chen |
| 2017/0013324 | A1 | 1/2017 | Chen |
| 2017/0070789 | A1 | 3/2017 | Liassides et al. |
| 2017/0094330 | A1 | 3/2017 | Maughan et al. |
| 2017/0150213 | A1 | 5/2017 | Cremer et al. |
| 2017/0171639 | A1 | 6/2017 | Bai |
| 2017/0180795 | A1 | 6/2017 | Cremer et al. |
| 2017/0195748 | A1 | 7/2017 | Shkedi et al. |
| 2017/0251247 | A1 | 8/2017 | Lee et al. |
| 2017/0295400 | A1 | 10/2017 | Jang et al. |
| 2018/0035149 | A1 | 2/2018 | Choi et al. |
| 2018/0098133 | A1 | 4/2018 | Liassides et al. |
| 2018/0295416 | A1 | 10/2018 | Haberman et al. |
| 2018/0302670 | A1 | 10/2018 | Lee et al. |
| 2019/0028778 | A1 | 1/2019 | Liassides et al. |
| 2020/0059692 | A1 | 2/2020 | Seo et al. |
| 2020/0228870 | A1 | 7/2020 | Gordon |
| 2020/0404348 | A1 | 12/2020 | Merchant et al. |
| 2021/0076095 | A1 | 3/2021 | Winograd et al. |
| 2021/0321154 | A1 | 10/2021 | Cormie et al. |
| 2021/0321155 | A1 | 10/2021 | Cormie et al. |
| 2021/0321160 | A1 | 10/2021 | Cormie et al. |
| 2021/0337267 | A1 | 10/2021 | Lee et al. |

OTHER PUBLICATIONS

International Search Report and Written Opinion, dated Jun. 15, 2021, in International Patent Application No. PCT/US2021/018995.
International Search Report and Written Opinion, dated Jun. 15, 2021, in International Patent Application No. PCT/US2021/018997.
Non-Final office action dated Mar. 1, 2022 of U.S. Appl. No. 17/162,310, filed Jan. 29, 2021.
Non-Final office action dated Nov. 12, 2021 of U.S. Appl. No. 17/162,490, filed Jan. 29, 2021.
Final office action dated May 6, 2022 of U.S. Appl. No. 17/162,490, filed Jan. 29, 2021.
U.S. Appl. No. 17/146,569, filed Jan. 12, 2021, Content-Modification System With Feature for Managing Multiple Content-Modification Requests.
Non-Final office action dated Nov. 12, 2021 of U.S. Appl. No. 17/162,299, filed Jan. 29, 2021.
Notice of Allowance dated Apr. 13, 2022 of U.S. Appl. No. 17/162,299, filed Jan. 29, 2021.
Notice of Allowance dated Sep. 14, 2022 of U.S. Appl. No. 17/162,490, filed Jan. 29, 2021.
Notice of Allowance dated Oct. 25, 2022 of U.S. Appl. No. 17/162,310, filed Jan. 29, 2021.

| Time Period | Content-Distribution System 102 | Content-Presentation Device 104 | Fingerprint-Matching Server 106 | Content-Management System 108 | Data-Management System 110 | Supplemental-Content Delivery System 112 |
|---|---|---|---|---|---|---|
| T1 | Transmit first content on a channel | | | | | |
| T2 | Generate first fingerprint data and first metadata | | | | | |
| T3 | Transmit first fingerprint data and first metadata | | | | | |
| T4 | | Receive second content | | | | |
| T5 | | Generate second fingerprint data and second metadata | | | | |
| T6 | | Transmit second fingerprint data and second metadata | | | | |
| T7 | | | Receive first fingerprint data and first metadata | | | |
| T8 | | | Receive second fingerprint data and second metadata | | | |

Figure 4A

| | | | | |
|---|---|---|---|---|
| T9 | | Compare first fingerprint data and second fingerprint data | | |
| T10 | | Detect a match between first fingerprint data and second fingerprint data | | |
| T11 | | Identify the channel on which the second content is being received | | |
| T12 | | Generate metadata associated with the identified channel | | |
| T13 | | Transmit an indication of the identified channel and the associated metadata | | |
| T14 | | | | Receive the indication of the identified channel and the associated metadata |

Figure 4B

|  |  |  |  |  |  |
|---|---|---|---|---|---|
| T15 |  | Determine historical content consumption data |  |  |  |
| T16 | Transmit third content |  |  |  |  |
| T17 | Generate third fingerprint data and third metadata |  |  |  |  |
| T18 | Transmit third fingerprint data and third metadata |  |  |  |  |
| T19 |  |  | Receive modifiable content segment |  |  |
| T20 |  |  | Generate fourth fingerprint data and fourth metadata |  |  |
| T21 |  |  | Transmit fourth fingerprint data and fourth metadata |  |  |
| T22 |  |  |  | Receive third fingerprint data and third metadata |  |
| T23 |  |  |  | Receive fourth fingerprint data and fourth metadata |  |

Figure 4C

| | | | | | | |
|---|---|---|---|---|---|---|
| T24 | Compare at least a portion of third fingerprint data and at least a portion of fourth fingerprint data | | | | | |
| T25 | Detect a match between at least a portion of third fingerprint data and at least a portion of fourth fingerprint data | | | | | |
| T26 | Identify an upcoming content modification opportunity on the identified channel | | | | | |
| T27 | Transmit the third fingerprint data and the third metadata | | | | | |
| T28 | | | | | Receive third fingerprint data and third metadata | |
| T29 | | | | | Receive fifth content | |
| T30 | | | | | Output for presentation fifth content | |

Figure 4D

| | | | | | | | |
|---|---|---|---|---|---|---|---|
| T31 | Generate fifth fingerprint data and fifth metadata | | | | | | |
| T32 | Compare the third fingerprint data and the fifth fingerprint data | | | | | | |
| T33 | Detect a match between the third fingerprint data and the fifth fingerprint data | | | | | | |
| T34 | Determine modification start time and modification end time | | | | | | |
| T35 | Transmit a request for supplemental content | | | | | | |
| T36 | | Receive request and select supplemental content | | | | | |
| T37 | | Transmit request for link | | | | | |
| T38 | | | | | | | Transmit link |

Figure 4E

| T39 | | | | Transmit link | | |
|---|---|---|---|---|---|---|
| T40 | Receive link and retrieve supplemental content | | | | | |
| T41 | Perform content modification operation | | | | | |

Figure 4F

CONTENT-MODIFICATION SYSTEM WITH FEATURE FOR DETECTING AND RESPONDING TO CONTENT MODIFICATIONS BY TUNER DEVICES

CROSS REFERENCE TO RELATED APPLICATIONS

This application is a continuation of U.S. patent application Ser. No. 17/162,490, filed Jan. 29, 2021, and now allowed, which claims priority to U.S. Provisional Pat. App. No. 63/007,339, filed Apr. 8, 2020, all of which are hereby incorporated by reference herein in their entireties.

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, a method includes identifying a group of multiple content-presentation devices that are tuned to the same channel and that are each scheduled to perform, at a modification start-time, a respective content-modification operation that comprises modifying a modifiable content-segment in connection with an upcoming content-modification opportunity on the channel. The method also includes determining that, after the modification start-time, at least a subgroup of the group of content-presentation devices have detected a mismatch between reference fingerprint data representing the modifiable content-segment and query fingerprint data representing content received by at least the subgroup of content-presentation devices. The method also includes determining that at least the subgroup of content-presentation devices are connected to tuner devices associated with the same content distributor. The method also includes in response to determining that at least the subgroup of content-presentation devices are connected to tuner devices associated with the same content distributor, performing an action.

In another aspect, a non-transitory computer-readable storage medium has stored thereon program instructions that, upon execution by a processor, cause performance of a set of operations. The set of operations includes identifying a group of multiple content-presentation devices that are tuned to the same channel and that are each scheduled to perform, at a modification start-time, a respective content-modification operation that comprises modifying a modifiable content-segment in connection with an upcoming content-modification opportunity on the channel. The set of operations also includes determining that, after the modification start-time, at least a subgroup of the group of content-presentation devices have detected a mismatch between reference fingerprint data representing the modifiable content-segment and query fingerprint data representing content received by at least the subgroup of content-presentation devices. The set of operations also includes determining that at least the subgroup of content-presentation devices are connected to tuner devices associated with the same content distributor. The set of operations also includes in response to determining that at least the subgroup of content-presentation devices are connected to tuner devices associated with the same content distributor, performing an action.

In another aspect, a computing system includes a processor and a non-transitory computer-readable storage medium, having stored thereon program instructions that, upon execution by the processor, cause performance of a set of operations. The set of operations includes identifying a group of multiple content-presentation devices that are tuned to the same channel and that are each scheduled to perform, at a modification start-time, a respective content-modification operation that comprises modifying a modifiable content-segment in connection with an upcoming content-modification opportunity on the channel. The set of operations also includes determining that, after the modification start-time, at least a subgroup of the group of content-presentation devices have detected a mismatch between reference fingerprint data representing the modifiable content-segment and query fingerprint data representing content received by at least the subgroup of content-presentation devices. The set of operations also includes determining that at least the subgroup of content-presentation devices are connected to tuner devices associated with the same content distributor. The set of operations also includes in response to determining that at least the subgroup of content-presentation devices are connected to tuner devices associated with the same content distributor, performing an action.

BRIEF DESCRIPTION OF THE DRAWINGS

FIGS. 4A, 4B, 4C, 4D, 4E, and 4F collectively make up a table showing example time-periods and corresponding operations that can be performed in connection with the example content-modification system.

DETAILED DESCRIPTION

I. Overview

Figure 1:
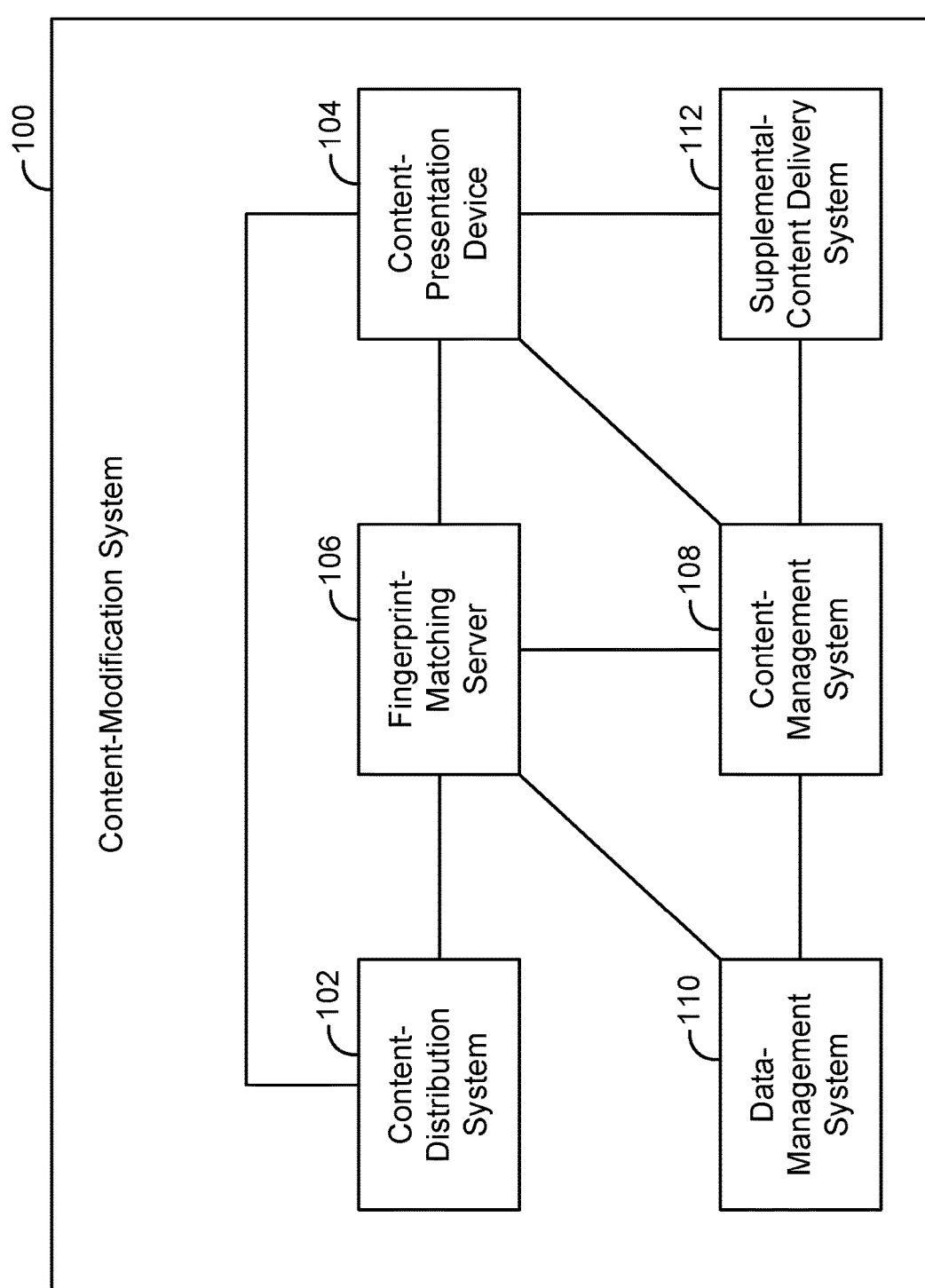
FIG. 1 is a simplified block diagram of an example content-modification system in which various described principles can be implemented.

To deliver and present content to end-users, a content provider can transmit the content to one or more content-distribution systems, each of which can in turn transmit the content to one or more respective content-presentation devices to be output for presentation to respective end-users. Such a hierarchical arrangement can facilitate convenient, widespread distribution of content.

By way of example, in order for a video content provider to deliver video content to end-users throughout the United States, the video content provider can transmit the video content by satellite or another medium to content-distribution systems that serve respective designated market areas (DMAs) within the United States. Each such content-distribution system can therefore receive the national satellite feed carrying the video content and can transmit the video content to television sets and/or set-top boxes in the content-distribution system's DMA, such that the video content can be output for presentation to respective end-users in that DMA. In practice, these content-distribution systems and their means of transmission to content-presentation devices can take various forms. For instance, a content-distribution system can be associated with a cable-television provider and can transmit video content to content-presentation devices of end-users who are cable-television subscribers through hybrid fiber/coaxial cable connections.

As such, in various scenarios, a content-distribution system can transmit content to a content-presentation device, which can receive and output the content for presentation to an end-user. In some situations, even though the content-presentation device receives content from the content-distribution system, it can be desirable for the content-presentation device to perform a content-modification operation so that the content-presentation device can output for presentation alternative content instead of at least a portion of that received content.

For example, in the case where the content-presentation device receives a linear sequence of content segments that includes a given advertisement segment positioned somewhere within the sequence, it can be desirable for the content-presentation device to replace the given advertisement segment with a different advertisement segment that is perhaps more targeted to the end-user (e.g., more targeted to the end-user's interests, demographics, etc.). As another example, it can be desirable for the content-presentation device to overlay on the given advertisement segment, overlay content that enhances the given advertisement segment in a way that is again perhaps more targeted to the end-user. The described content-modification system can facilitate providing these and other related features.

In one example, the content-modification system can include a fingerprint-matching server that can identify an upcoming content-modification opportunity on an identified channel, which it can do by comparing and detecting a match between two different instances of fingerprint data. Based on the detected match, the fingerprint-matching server can then transmit fingerprint data and metadata to the content-presentation device data to facilitate preparing the content-presentation device to perform a content-modification operation in connection with the identified upcoming content-modification opportunity.

However, in other cases, it may be desirable for the content-presentation device to use one or more alternative techniques to facilitate performing a content-modification operation.

For example, the fingerprint-matching server can use broadcast-schedule data to facilitate the content-presentation device performing a content-modification operation. Among other things, this can allow the content-presentation device to facilitate performing a content-modification operation without using fingerprint data or by using fingerprint data in a more limited fashion. This can be beneficial in the case where the content-presentation device does not receive or otherwise have access to fingerprint data, or where the use of fingerprint data is undesirable for one or more reasons (e.g., because fingerprint-based techniques may be computationally expensive).

In accordance with an upcoming content-modification opportunity, a content-presentation device or other content display device of the content-modification system can be scheduled to replace a modifiable content-segment (e.g., an advertisement designated as a candidate for replacement) with supplemental content (e.g., a replacement advertisement) at a modification start-time. However, there can be situations in which the content-presentation device does not receive the modifiable content-segment.

For example, this can be due to broadcast schedule slippage in which a content-distribution system is originally scheduled to broadcast the modifiable content-segment, but instead broadcasts alternative content (e.g., a different advertisement) without providing the content-modification system with an updated broadcast schedule. In this situation, the content-presentation device can receive the alternative content instead of the modifiable content-segment that the content-presentation device is expecting to receive.

As another example, the content-presentation device can be connected to a set-top box (STB) or other type of tuner device that is not part of the content-modification system and is associated with a multi-channel content distributor such as a multi-channel video program distributor (MVPD). With such an arrangement, before the modification start-time, the STB might replace the modifiable content-segment with alternative content, different from the supplemental content, such as a different replacement advertisement associated with an advertiser with which the MVPD has made an agreement to run advertisements. In this situation, the content that the content-presentation device receives can include the alternative content instead of the modifiable content-segment that the content-presentation device is expecting to receive.

As a result, beginning at the modification start-time of the content-modification opportunity, the content-presentation device might initiate replacement of the alternative content with the supplemental content. Then, after a short period of time (e.g., a few seconds after the modification start-time), the content-presentation device might determine that the content that is being replaced is not the expected modifiable content-segment. For example, if the STB replaces the modifiable content-segment, the content-presentation device can receive, from the fingerprint-matching server, reference fingerprint data representing the modifiable content-segment and locally compare the reference fingerprint data against query fingerprint data that is generated by the content-presentation device and that represents the content being received from the STB (e.g., the alternative content, instead of the modifiable content-segment). The content-presentation device can thus detect a mismatch between the reference fingerprint data and the query fingerprint data and can responsively stop performing (e.g., abort) the content-replacement operation.

Further, when performance of the content-replacement operation is stopped, the display of the alternative content might abruptly end after a few seconds worth of frames, and the supplemental content might be displayed thereafter. Thus, the content-presentation device stopping performance of the content-modification operation after the content-modification operation has already begun can result in an undesirable user experience. This can also be problematic in situations where a large number (e.g., hundreds or thousands) of content-presentation devices are scheduled to perform content-modifications at the upcoming content-modification opportunity, but are connected to respective STBs that cause the content-presentation devices to detect mismatches.

Accordingly, the present disclosure provides methods and systems that improve the content modification process for a content-modification system by providing a mechanism that enables the content-presentation device to override the alternative content in the situations described above, especially in the situations in which the STB modifies the modifiable content-segment with the alternative content. The present methods and systems might also facilitate the content-presentation device performing alternative actions as well in such situations, such as notifying the fingerprint-matching server that the content-presentation device did not receive the modifiable content-segment and/or aborting the content-modification operation.

In particular, the content-presentation device can receive reference fingerprint data representing the modifiable content-segment and make a comparison of the reference fingerprint data with query fingerprint data representing content received by the content-presentation device from a tuner device connected to the content-presentation device. Based on the comparison, the content-presentation device can detect, within a predefined time period (e.g., second) after the modification start-time and during performance of the content-modification operation, a mismatch between the reference fingerprint data and the query fingerprint data. In response to detecting the mismatch within the predefined time period after the modification start-time and during performance of the content-modification operation, the content-presentation device can perform an action, such as continuing the content-modification operation, aborting the content-modification operation, or notifying another computing system in the content-modification system of the mismatch being detected within the predefined time period.

Additionally, the present methods and systems provide operations that can be performed on the server-side in conjunction with the content-presentation device improvements described above.

In particular, the fingerprint-matching server can determine that the content-presentation device has detected the mismatch within the predefined time period after the modification start-time and during performance of the content-modification operation. The fingerprint-matching server can then determine that the mismatch is due to the tuner device having modified the modifiable content-segment before the modification start-time, and responsively perform an action, such as an action that facilitates the content-presentation device aborting or continuing its content-modification operation.

Furthermore, the present methods and systems also provide operations that improve the manner in which the content-modification system detects and responds to situations in which fingerprint mismatches detected by a group of content-presentation devices (e.g., tens, hundreds, or thousands of devices) are all or mostly occurring within the same content distributor footprint.

In particular, the fingerprint-matching server can identify a group of content-presentation devices (e.g., tens, hundreds, or thousands) that are tuned to the same channel and each scheduled to perform a respective content-modification operation at the modification start-time. The fingerprint-matching server can determine that at least a subgroup of devices of that group have detected a mismatch between reference fingerprint data representing the modifiable content-segment and query fingerprint data representing content received by at least the subgroup of content-presentation devices. The fingerprint-matching server can then determine that at least the subgroup of content-presentation devices are connected to tuner devices associated with the same content distributor (e.g., the same MVPD, and perhaps additionally in the same geographic area) and, in response to this determination, the fingerprint-matching server can performing an action, such as an action that facilitates at least the subgroup of devices continuing or aborting their respective content-modification operations.

With the disclosed methods and systems, the content-modification system is advantageously given the ability to exercise more control over what to do in the event of content-modification attempts made by tuner devices and associated content distributors. Further, the disclosed actions that the content-presentation device, fingerprint-matching server, and/or other components of the content-modification system can perform in response to detecting such events can reduce the likelihood that the content-presentation devices' performances of the content-modification operations will be stopped partway through, thus advantageously helping provide content-presentation devices—possibly a large number (e.g., hundreds or thousands) of content-presentation devices—with desirable user experiences. Still further, the predefined time period, when taken in to account in some embodiments, can provide tolerance to a content-presentation device for the content-presentation device to determine whether the mismatch was detected due to the tuner device or due to another event (e.g., a channel-change event).

These and other advantages will be described in more detail in the following sections.

II. Architecture

A. Content-Modification System

FIG. 1 is a simplified block diagram of an example content-modification system 100. The content-modification system 100 can include various components, such as a content-distribution system 102, a content-presentation device 104, a fingerprint-matching server 106, a content-management system 108, a data-management system 110, and/or a supplemental-content delivery system 112.

The content-modification system 100 can also include one or more connection mechanisms that connect various components within the content-modification system 100. For example, the content-modification system 100 can include the connection mechanisms represented by lines connecting components of the content-modification system 100, as shown in FIG. 1.

In this disclosure, the term "connection mechanism" means a mechanism that connects and facilitates communication between two or more components, devices, systems, or other entities. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, communication (e.g., a transmission or receipt of data) can be a direct or indirect communication.

The content-modification system 100 and/or components thereof can take the form of a computing system, an example of which is described below.

Notably, in practice, the content-modification system 100 is likely to include many instances of at least some of the described components. For example, the content-modification system 100 is likely to include many content-distribution systems and many content-presentation devices.

B. Computing System

Figure 2:
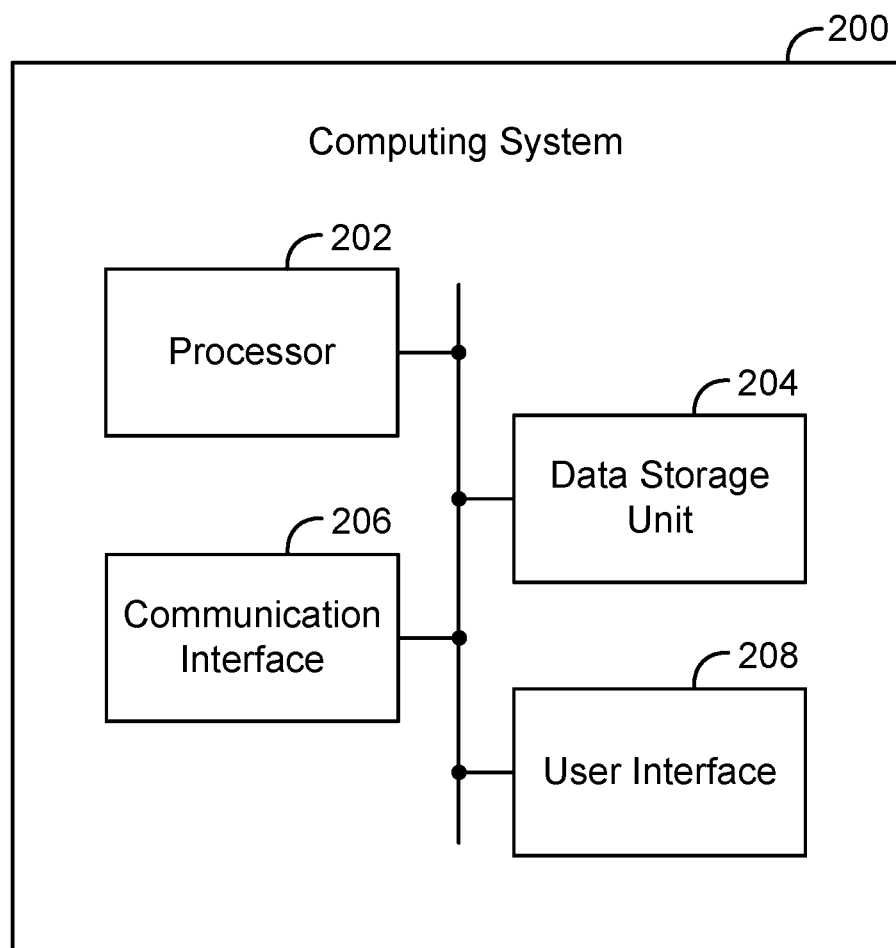
FIG. 2 is a simplified block diagram of an example computing system in which various described principles can be implemented.

FIG. 2 is a simplified block diagram of an example computing system 200. The computing system 200 can be configured to perform and/or can perform one or more operations, such as the operations described in this disclosure. The computing system 200 can include various components, such as a processor 202, a data-storage unit 204, a communication interface 206, and/or a user interface 208.

The processor 202 can be or include a general-purpose processor (e.g., a microprocessor) and/or a special-purpose processor (e.g., a digital signal processor). The processor 202 can execute program instructions included in the data-storage unit 204 as described below.

The data-storage unit 204 can be or include one or more volatile, non-volatile, removable, and/or non-removable storage components, such as magnetic, optical, and/or flash storage, and/or can be integrated in whole or in part with the processor 202. Further, the data-storage unit 204 can be or include a non-transitory computer-readable storage medium, having stored thereon program instructions (e.g., compiled or non-compiled program logic and/or machine code) that, upon execution by the processor 202, cause the computing system 200 and/or another computing system to perform one or more operations, such as the operations described in this disclosure. These program instructions can define, and/or be part of, a discrete software application.

In some instances, the computing system 200 can execute program instructions in response to receiving an input, such as an input received via the communication interface 206 and/or the user interface 208. The data-storage unit 204 can also store other data, such as any of the data described in this disclosure.

The communication interface 206 can allow the computing system 200 to connect with and/or communicate with another entity according to one or more protocols. Therefore, the computing system 200 can transmit data to, and/or receive data from, one or more other entities according to one or more protocols. In one example, the communication interface 206 can be or include a wired interface, such as an Ethernet interface or a High-Definition Multimedia Interface (HDMI). In another example, the communication interface 206 can be or include a wireless interface, such as a cellular or WI-FI interface.

The user interface 208 can allow for interaction between the computing system 200 and a user of the computing system 200. As such, the user interface 208 can be or include an input component such as a keyboard, a mouse, a remote controller, a microphone, and/or a touch-sensitive panel. The user interface 208 can also be or include an output component such as a display device (which, for example, can be combined with a touch-sensitive panel) and/or a sound speaker.

The computing system 200 can also include one or more connection mechanisms that connect various components within the computing system 200. For example, the computing system 200 can include the connection mechanisms represented by lines that connect components of the computing system 200, as shown in FIG. 2.

The computing system 200 can include one or more of the above-described components and can be configured or arranged in various ways. For example, the computing system 200 can be configured as a server and/or a client (or perhaps a cluster of servers and/or a cluster of clients) operating in one or more server-client type arrangements, for instance.

As noted above, the content-modification system 100 and/or components thereof can take the form of a computing system, such as the computing system 200. In some cases, some or all these entities can take the form of a more specific type of computing system. For instance, in the case of the content-presentation device 104, it can take the form of a desktop computer, a laptop, a tablet, a mobile phone, a television set, a set-top box, a television set with an integrated set-top box, a media dongle, or a television set with a media dongle connected to it, among other possibilities.

III. Example Operations

The content-modification system 100 and/or components thereof can be configured to perform and/or can perform one or more operations. Examples of these operations and related features will now be described.

As noted above, in practice, the content-modification system 100 is likely to include many instances of at least some of the described components. Likewise, in practice, it is likely that at least some of described operations will be performed many times (perhaps on a routine basis and/or in connection with additional instances of the described components).

A. Operations Related to the Content-Distribution System Transmitting Content and the Content-Presenting Device Receiving and Outputting Content For context, general operations and examples related to the content-distribution system 102 transmitting content and the content-presentation device 104 receiving and outputting content will now be described.

To begin, the content-distribution system 102 can transmit content (e.g., that it received from a content provider) to one or more entities such as the content-presentation device 104. Content can be or include audio content and/or video content, for example. In some examples, content can take the form of a linear sequence of content segments (e.g., program segments and advertisement segments) or a portion thereof. In the case of video content, a portion of the video content may be one or more frames, for example.

The content-distribution system 102 can transmit content on one or more channels (sometimes referred to as stations or feeds). As such, the content-distribution system 102 can be associated with a single channel content distributor or a multi-channel content distributor such as a multi-channel video program distributor (MVPD).

The content-distribution system 102 and its means of transmission of content on the channel to the content-presentation device 104 can take various forms. By way of example, the content-distribution system 102 can be or include a cable-television head-end that is associated with a cable-television provider and that transmits the content on the channel to the content-presentation device 104 through hybrid fiber/coaxial cable connections. As another example, the content-distribution system 102 can be or include a satellite-television head-end that is associated with a satellite-television provider and that transmits the content on the channel to the content-presentation device 104 through a satellite transmission. As yet another example, the content-distribution system 102 can be or include a television-broadcast station that is associated with a television-broadcast provider and that transmits the content on the channel through a terrestrial over-the-air interface to the content-presentation device 104. In these and other examples, the content-distribution system 102 can transmit the content in the form of an analog or digital broadcast stream representing the content.

The content-presentation device 104 can receive content from one or more entities, such as the content-distribution system 102. In one example, the content-presentation device 104 can select (e.g., by tuning to) a channel from among multiple available channels, perhaps based on input received via a user interface, such that the content-presentation device 104 can receive content on the selected channel.

In some examples, the content-distribution system 102 can transmit content to the content-presentation device 104, which the content-presentation device 104 can receive, and therefore the transmitted content and the received content can be the same. However, in other examples, they can be different, such as where the content-distribution system 102 transmits content to the content-presentation device 104, but the content-presentation device 104 does not receive the content and instead receives different content from a different content-distribution system.

The content-presentation device 104 can also output content for presentation. As noted above, the content-presentation device 104 can take various forms. In one example, in the case where the content-presentation device 104 is a television set (perhaps with an integrated set-top box and/or media dongle), outputting the content for presentation can involve the television set outputting the content via a user interface (e.g., a display device and/or a sound speaker), such that it can be presented to an end-user. As another example, in the case where the content-presentation device 104 is a set-top box or a media dongle, outputting the content for presentation can involve the set-top box or the media dongle outputting the content via a communication interface (e.g., an HDMI interface), such that it can be received by a television set and in turn output by the television set for presentation to an end-user.

As such, in various scenarios, the content-distribution system 102 can transmit content to the content-presentation device 104, which can receive and output the content for presentation to an end-user. In some situations, even though the content-presentation device 104 receives content from the content-distribution system 102, it can be desirable for the content-presentation device 104 to perform a content-modification operation so that the content-presentation device 104 can output for presentation alternative content instead of at least a portion of that received content.

For example, in the case where the content-presentation device 104 receives a linear sequence of content segments that includes a given advertisement segment positioned somewhere within the sequence, it can be desirable for the content-presentation device 104 to replace the given advertisement segment with a different advertisement segment that is perhaps more targeted to the end-user (i.e., more targeted to the end-user's interests, demographics, etc.). As another example, it can be desirable for the content-presentation device 104 to overlay on the given advertisement segment, overlay content that enhances the given advertisement segment in a way that is again perhaps more targeted to the end-user. The described content-modification system 100 can facilitate providing these and other related features.

As noted above, in one example, content can take the form of a linear sequence of content segments. As such, in one example, the content-distribution system 102 can transmit a linear sequence of content segments. This is referred to herein as a "transmission sequence." Likewise, the content-presentation device 104 can receive a linear sequence of content segments. This is referred to herein as a "receipt sequence." In line with the discussion above, the transmission sequence and the receipt sequence can be the same or they can be different.

Figure 3:
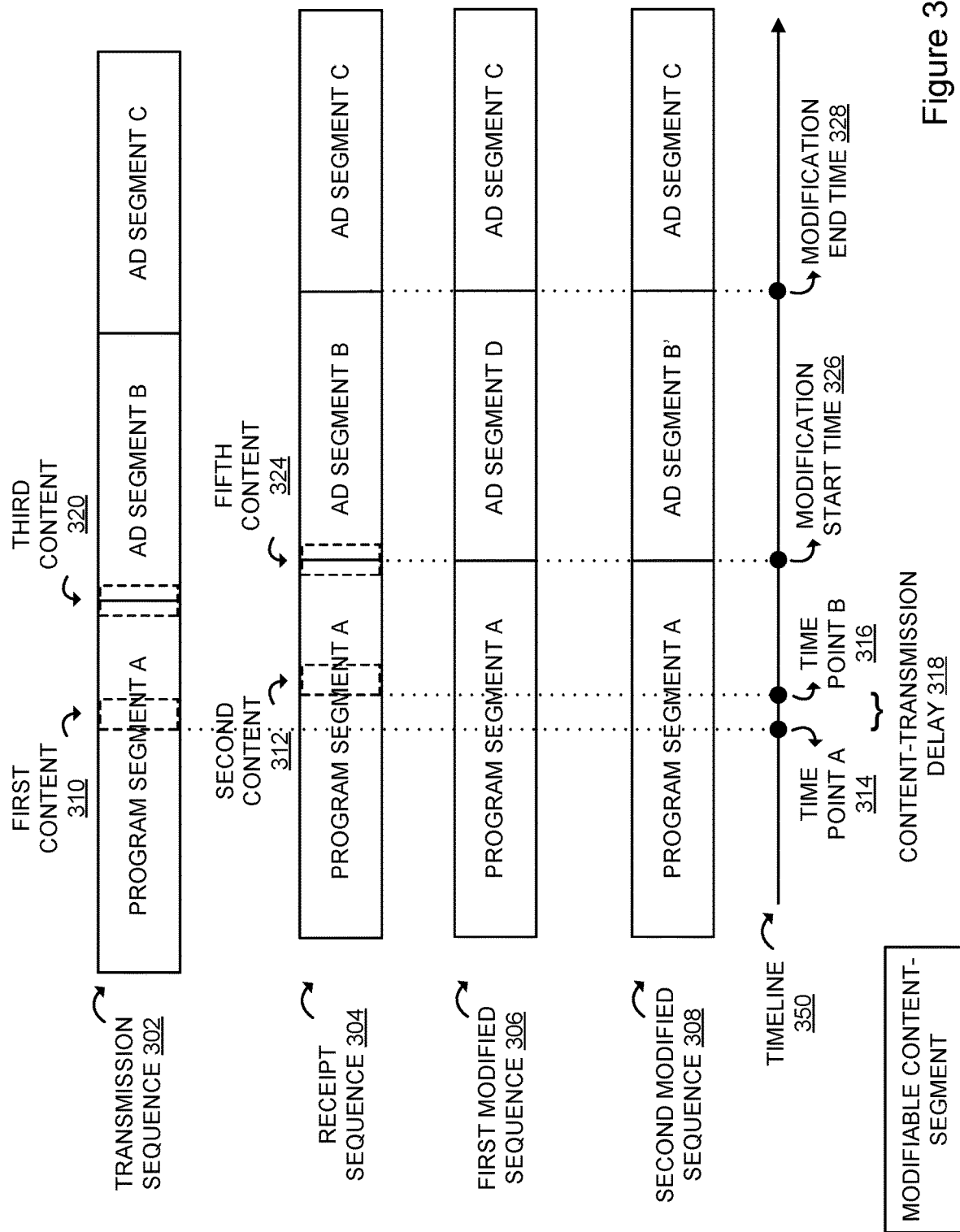
FIG. 3 is a diagram of example linear sequences of content and related concepts.

FIG. 3 illustrates some examples of these concepts. In one example, the transmission sequence is the TRANSMISSION SEQUENCE 302 shown in FIG. 3. As shown, the TRANSMISSION SEQUENCE 302 includes a PROGRAM SEGMENT A, followed by an AD SEGMENT B, followed by an AD SEGMENT C.

Likewise, in one example, the receipt sequence is the RECEIPT SEQUENCE 304 shown in FIG. 3. In this example, the content-distribution system 102 transmits the TRANSMISSION SEQUENCE 302 to the content-presentation device 104, which the content-presentation device 104 receives as the RECEIPT SEQUENCE 304, and therefore the TRANSMISSION SEQUENCE 302 and the RECEIPT SEQUENCE 304 are the same. As such, as shown, the RECEIPT SEQUENCE 304 also includes the PROGRAM SEGMENT A, followed by the AD SEGMENT B, followed by the AD SEGMENT C.

In FIG. 3, the transmission time of the TRANSMISSION SEQUENCE 302 and the receipt time of the RECEIPT SEQUENCE 304 are shown by way of their relationship to a TIMELINE 350. Notably, the transmission time and the receipt time are offset from each other due to a content-transmission delay, which is described in greater detail below.

As noted above, in some situations, even though the content-presentation device 104 receives content from the content-distribution system 102, it can be desirable for the content-presentation device 104 to perform a content-modification operation so that the content-presentation device 104 can output for presentation alternative content instead of at least a portion of that received content. For example, in the case where the content-presentation device 104 receives the receipt sequence, rather than outputting for presentation the receipt sequence, the content-presentation device 104 can output for presentation a modified version of the receipt sequence instead. This is referred to herein as a "modified sequence."

For example, in the case where the receipt sequence includes a given advertisement segment positioned somewhere within the receipt sequence, it can be desirable for the content-presentation device 104 to replace the given advertisement segment with a different advertisement segment that is perhaps more targeted to the end-user (i.e., more targeted to the end-user's interests, demographics, etc.), thereby resulting in a modified sequence that the content-presentation device 104 can output for presentation.

To illustrate this, in one example, the modified sequence is the FIRST MODIFIED SEQUENCE 306 shown in FIG. 3. As shown, the FIRST MODIFIED SEQUENCE 306 includes the PROGRAM SEGMENT A, followed by the AD SEGMENT D (which replaced the AD SEGMENT B), followed by the AD SEGMENT C.

As another example, it can be desirable for the content-presentation device 104 to overlay on the given advertisement segment, overlay content that enhances the given advertisement segment in a way that is again perhaps more targeted to the end-user, thereby resulting in a modified sequence that the content-presentation device 104 can output for presentation.

To illustrate this, in another example, the modified sequence is the SECOND MODIFIED SEQUENCE 308 shown in FIG. 3. As shown, the SECOND MODIFIED SEQUENCE 308 includes the PROGRAM SEGMENT A, followed by the AD SEGMENT B' (which is the AD SEGMENT B modified with overlay content), followed by the AD SEGMENT C.

Other portions of FIG. 3 will be described later in this disclosure as related concepts are introduced and described.

Moving on in view of the context provided above, FIGS. 4A, 4B, 4C, 4D, 4E, and 4F, collectively make up a table showing example time-periods and corresponding operations that can be performed in connection with the content-modification system 100. These and other related operations will now be described.

B. Operations Related to the Content-Distribution System Transmitting First Content on a Channel During a time-period T1, the content-distribution system 102 can transmit content on a channel to the content-presentation device 104. This content is referred to herein as "first content." In one example, the first content is the FIRST CONTENT 310 shown in FIG. 3.

During a time-period T2, the content-distribution system 102 can generate fingerprint data representing the first content. This fingerprint data is referred to herein as "first fingerprint data." The content-distribution system 102 can generate the first fingerprint data using any content fingerprinting process now known or later developed. An example fingerprint generation technique is described in U.S. Pat. No. 9,495,451 issued Nov. 15, 2016, the entirety of which is hereby incorporated by reference herein. The content-distribution system 102 can generate first fingerprint data at a given rate, such as at the rate of one fingerprint per frame of the first content. The first fingerprint data can be or include some or all of these generated fingerprints.

The content-distribution system 102 can access the first content at various points within the content-distribution system 102. As one example, the content-distribution system 102 can access the first content after it is output by a distribution amplifier within the content-distribution system 102.

Also during the time-period T2, the content-distribution system 102 can generate metadata associated with the first content and/or the first fingerprint data. This metadata is referred to herein as "first metadata." In one example, the first metadata can be or include a transmission time-stamp, which represents a time-point at which the content-distribution system 102 transmitted the first content. The content-distribution system 102 can determine the transmission time-stamp in various ways, such as based on a time clock that is synchronized to a reference clock.

As another example, the first metadata can be or include a channel identifier, which identifies the channel on which the content-distribution system 102 is transmitting the first content. The content-distribution system 102 can determine the channel identifier in various ways such as based on mapping data that maps the content-distribution system 102 and/or physical inputs and/or outputs within the content-distribution system 102 to respective channel identifiers. In one example, in the case where the content-distribution system 102 transmits content A on channel A, content B on channel B, and content C on channel C, the mapping data can specify which of three different outputs (perhaps on three different distribution amplifiers) maps to which channel identifier, such that the content-distribution system 102 can determine the appropriate channel identifier for content of a given channel.

As another example, the first metadata can be or include SCTE-104 data, a watermark, or a similar type of metadata, any of which can themselves encode other metadata, such as a program identifier, an advertisement identifier (e.g., an industry standard coding identification (ISCI) key), a program genre, or another type of textual or numeric metadata, for instance.

The content-distribution system 102 can associate the first fingerprint data with the first metadata in various ways. For instance, in the case where the first fingerprint data includes multiple fingerprints with each fingerprint representing a corresponding frame of the first content, the content-distribution system 102 can associate each fingerprint with a corresponding transmission time-stamp and/or with other corresponding first metadata.

During a time-period T3, the content-distribution system 102 can transmit the first fingerprint data and the first metadata to the fingerprint-matching server 106. The content-distribution system 102 can transmit the first fingerprint data and the first metadata at a given interval. For example, every two seconds, the content-distribution system 102 can transmit the first fingerprint data and the first metadata that it generated during that most recent two-second time-period.

C. Operations Related to the Content-Presentation Device Receiving Second Content During a time-period T4, the content-presentation device 104 can receive content from the content-distribution system 102. This content is referred to herein as "second content." In one example, the second content is the SECOND CONTENT 312 shown in FIG. 3.

During a time-period T5, the content-presentation device 104 can generate fingerprint data representing the second content. This fingerprint data is referred to herein as "second fingerprint data." The content-presentation device 104 can generate the second fingerprint data using any content fingerprinting process now known or later developed. The content-presentation device 104 can generate the second fingerprint data at various rates, such as at the rate of one fingerprint per frame of the second content. The second fingerprint data can be or include some or all of these generated fingerprints.

The content-presentation device 104 can access the second content at various points within the content-presentation device 104. As one example, the content-presentation device 104 can access the second content as it is being received by an input buffer (e.g., an HDMI buffer) of the content-presentation device 104. In another configuration, the content-presentation device 104 can access the second content as it is being received by a display buffer of the content-presentation device 104. In this configuration, the second content can therefore be content that the content-presentation device 104 not only receives, but also outputs for presentation.

Also during the time-period T5, the content-presentation device 104 can generate metadata associated with the second content and/or the second fingerprint data. This metadata is referred to herein as "second metadata." As one example, the second metadata can be or include a receipt time-stamp, which represents a time-point at which the content-presentation device 104 received the second content. The content-presentation device 104 can determine the receipt time-stamp in various ways, such as based on a time clock that is synchronized to a reference clock. As noted above, the content-presentation device 104 can access the second content at various points within the content-presentation device 104. In one example, the point at which the second content is accessed can be considered the "receipt" point for purposes of determining the receipt time-stamp.

In practice, while the first metadata is likely to be or include a channel identifier, the second metadata is likely to not be nor include a channel identifier.

The content-presentation device 104 can associate the second fingerprint data with the second metadata in various ways. For instance, where the second fingerprint data includes multiple fingerprints with each fingerprint representing a corresponding frame of second content, the content-presentation device 104 can associate each second fingerprint with a corresponding receipt time-stamp and/or other corresponding metadata.

During a time-period T6, the content-presentation device 104 can transmit the second fingerprint data and the second metadata to the fingerprint-matching server 106. The content-presentation device 104 can transmit the second fingerprint data and the second metadata at a given interval. For example, every two seconds, the content-presentation device 104 can transmit the second fingerprint data and the second metadata that it generated during that most recent two-second time-period.

D. Operations Related to Identifying a Channel on which the Content-Presentation Device is Receiving the Second Content During a time-period T7, the fingerprint-matching server 106 can receive the first fingerprint data and the first metadata from the content-distribution system 102. As noted above, the first fingerprint data represents the first content transmitted by the content-distribution system 102 on the channel. As noted above, the first metadata can, and for the purposes of this described example does, identify the channel. In this way, the first content can be considered as content being transmitted on an identified channel.

During a time-period T8, the fingerprint-matching server 106 can receive the second fingerprint data and the second metadata from the content-presentation device 104. As noted above, the second fingerprint data represents the second content received by the content-presentation device 104. However, as noted above, the associated metadata may not, and for the purposes of this described example does not, identify the channel. In this way, the second content can be considered as content being received on an unidentified channel.

During a time-period T9, the fingerprint-matching server 106 can compare the first fingerprint data and the second fingerprint data to determine whether there is a match. In this disclosure, this type of match attempt, namely a match attempt between (i) reference fingerprint data representing content being transmitted on an identified channel and (ii) query fingerprint data representing content being received on an unidentified channel, is referred to herein as a "cold match attempt."

During a time-period T10, based on the comparing, the fingerprint-matching server 106 can detect a match between the first fingerprint data and the second fingerprint data. The fingerprint-matching server 106 can compare and/or detect a match between fingerprint data using any content fingerprint comparing and matching technique now known or later developed. An example fingerprint comparing and matching technique is described in U.S. Pat. No. 9,146,990 issued Sep. 29, 2015, the entirety of which is hereby incorporated by reference herein.

To effectively compare the first fingerprint data and the second fingerprint data, the fingerprint-matching server 106 may need to account for a content-transmission delay. For context, in the case where the content-distribution system 102 transmits a given frame of content on a given channel at a time-point A, for various reasons, the content-presentation device 104 may not receive that frame until a time-point B that is later (e.g., ten seconds later) than the time-point A. This type of delay is referred to herein as a "content-transmission delay."

In one example, the time-point A, the time-point B, and the content-transmission delay can be the TIME-POINT A 314, the TIME-POINT B 316, and the CONTENT-TRANSMISSION DELAY 318, respectively, shown FIG. 3. Note that FIG. 3 is for illustration purposes and is not necessarily to scale at least with respect to time. In practice, the actual amount of content-transmission delay may be different from the amount shown.

To help the fingerprint-matching server 106 effectively compare the first fingerprint data with the second fingerprint data, the fingerprint-matching server 106 may need to account for such a content-transmission delay. In one example, the fingerprint-matching server 106 can do this by comparing the first fingerprint data that it receives at a receipt time-point with the second fingerprint data that it receives during a time-period defined by a starting time-point and an ending time-point. The starting time-point can be the receipt time-point plus an offset representing an anticipated content-transmission delay (e.g., ten seconds), minus a tolerance a time-period (e.g., two seconds). The ending time-point can be the receipt time-point plus the offset (e.g., ten seconds), plus the tolerance a time-period (e.g., two seconds). As such, in one example where the anticipated content-transmission delay is 10 seconds, the fingerprint-matching server 106 can compare first fingerprint data that it receives at a receipt time-point with second fingerprint data that it receives during a time-period between (i) the receipt time-point plus eight seconds and (ii) receipt time-point plus twelve seconds.

In some cases, the fingerprint-matching server 106 can determine a content-transmission delay, which it can use to select an appropriate offset for use in determining the starting and ending time-points, as described above. The fingerprint-matching server 106 can determine the content-transmission delay in various ways. For example, after the fingerprint-matching server 106 detects a match based on a cold match attempt, the fingerprint-matching server 106 can determine the content-transmission delay as a difference between the corresponding transmission time-stamp (of the first metadata) and the corresponding receipt time-stamp (of the second metadata), for example. Notably, the content-transmission delay can vary from channel to channel.

During a time-period T11, based on the detected match, the fingerprint-matching server 106 can identify the channel on which the second content is being received by the content-presentation device 104. In one example, the fingerprint-matching server 106 can identify the channel based on the channel identifier metadata associated with the first fingerprint data used to detect the match.

Notably, in practice, since there are likely to be multiple potential channels on which the content-presentation device 104 is receiving the second content, the fingerprint-matching server 106 is likely to compare the second fingerprint data with multiple instances of first fingerprint data (each representing a different respective instance of first content on a different respective channel), to determine which of those multiple instances matches the second fingerprint data.

Also, in some cases, the fingerprint-matching server 106 can detect a match between the second fingerprint data and each of multiple instances of first fingerprint data (each representing a different respective instance of first content on a different respective channel). This is referred to herein as a "multimatch scenario" and can occur for various reasons. For example, this can occur when the content-distribution system 102 is transmitting the same or similar content on more than one channel at or about the same time. In this scenario, the fingerprint-matching server 106 can perform additional operations to identity, from among the multiple channels associated with the multimatch scenario, on which specific channel the content-presentation device 104 is receiving the second content. The fingerprint-matching server 106 can do this using any channel multimatch disambiguation technique now known or later developed. An example channel multimatch disambiguation technique is described in U.S. Pat. No. 9,992,533 issued Jun. 5, 2018, the entirety of which is hereby incorporated by reference herein.

E. Operations Related to Determining Historical Content Consumption Data

During a time-period T12, the fingerprint-matching server 106 can generate metadata associated with the identified channel. For example, the metadata can be or include a channel identification time-stamp. The fingerprint-matching server 106 can determine the channel identification time-stamp in various ways, such as based on a time clock that is synchronized to a reference clock. In another example, the metadata can be or include a device identifier that identifies the content-presentation device 104 that is receiving content on the identified channel. The fingerprint-matching server 106 can determine the device identifier in various ways, such as by receiving it from the content-presentation device 104. In another example, the fingerprint-matching server 106 can receive data (e.g., device registration data) from the content-presentation device 104 and can use mapping data to map the received data to determine the device identifier.

During a time-period T13, the fingerprint-matching server 106 can transmit an indication of the identified channel and the associated metadata to the data-management system 110.

During a time-period T14, the data-management system 110 can receive the indication of the identified channel and the associated metadata from the fingerprint-matching server 106.

The data-management system 110 can use the received indication of the identified channel and the associated metadata, perhaps with other data, to determine when the content-presentation device 104 has received content on the identified channel, what specific content the content-presentation device 104 has received, etc. This type of data is referred to herein as "historical content consumption data."

As such, during a time-period T15, the data-management system 110 can determine historical content consumption data associated with the content-presentation device 104.

F. Operations Related to the Content-Distribution System Transmitting Third Content As noted above, the fingerprint-matching server 106 can identify the channel on which the content-presentation device 104 is receiving the second content.

During a time-period T16, the content-distribution system 102 can transmit content on the identified channel to the content-presentation device 104. This content is referred to herein as "third content." In one example, the third content is the THIRD CONTENT 320 shown in FIG. 3. In practice, the content-distribution system 102 is likely to transmit the third content shortly after (e.g., immediately after or a few seconds or minutes after) transmitting the first content.

During a time-period T17, the content-distribution system 102 can generate fingerprint data representing the third content. This fingerprint data is referred to herein as "third fingerprint data."

Also during the time-period T17, the content-distribution system 102 can generate metadata associated with the third content and/or the third fingerprint data. This metadata is referred to herein as "third metadata." The content-distribution system 102 can also associate the third fingerprint data with the third metadata.

During a time-period T18, the content-distribution system 102 can transmit the third fingerprint data and the third metadata to the fingerprint-matching server 106.

The content-distribution system 102 can transmit the third content, generate the third fingerprint data, generate the third metadata, associate the third fingerprint data with the third metadata, and transmit the third fingerprint data and the third metadata in various ways, such as ways that are the same as or similar to those described above in connection with transmitting the first content, generating the first fingerprint data, generating the first metadata, associating the first fingerprint data with the first metadata, and transmitting the first fingerprint data and the first metadata.

G. Operations Related to the Content-Management System Receiving a Modifiable Content-Segment During a time-period T19, the content-management system 108 can receive content in the form of a content segment that has been identified as a candidate to be modified. This content is referred to herein as a "modifiable content-segment" or "fourth content." In one example, the modifiable content-segment is the MODIFIABLE CONTENT-SEGMENT shown in FIG. 3.

The modifiable content-segment can take various forms. For example, the modifiable content-segment can be an advertisement segment (e.g., a commercial) or a program segment. As such, in one example, the modifiable content-segment can be an advertisement segment that has been identified as a candidate to be modified, perhaps by way of being replaced with a different advertisement segment, and/or by way of having content overlaid thereon.

In one example, a user, perhaps associated with the content-distribution system 102, can facilitate uploading the modifiable content-segment to the content-management system 108, such that the content-management system 108 can receive it in this way.

During a time-period T20, the content-management system 108 can generate fingerprint data representing the modifiable content-segment. This fingerprint data is referred to herein as "fourth fingerprint data." The content-management system 108 can generate the fourth fingerprint data using any fingerprint generation technique now known or later developed. The content-management system 108 can generate the fourth fingerprint data at a given rate, such as at the rate of one fingerprint per frame of the fourth content. The fourth fingerprint data can be or include some or all of these generated fingerprints.

Also during the time-period T20, the content-management system 108 can generate metadata associated with the modifiable content-segment and/or the fourth fingerprint data. This metadata is referred to herein as "fourth metadata." As one example, the fourth metadata can be or include a duration of the modifiable content-segment. The content-management system 108 can determine the duration in various ways, such as based on the fingerprint generation process. For example, in the case where the content-management system 108 generating the fourth fingerprint data involves generating one fingerprint per frame, where the modifiable content-segment has a frame rate of 30 frames per second, and where the fingerprinting process results in 300 fingerprints being generated, the content-management system 108 can deduce that the modifiable content-segment has a duration of ten seconds. The metadata can also be or include other information about the modifiable content-segment, such as a content segment identifier, a title, and/or specifics about permissible ways in which the modifiable content-segment can be modified, etc.

During a time-period T21, the content-management system 108 can transmit the fourth fingerprint data and the fourth metadata to the fingerprint-matching server 106.

In practice, the content-management system 108 is likely to receive many modifiable content-segments. In such situations, the content-management system 108 can perform one or more of the operations described above, as appropriate for each of the many received modifiable content-segments. As such, the content-management system 108 can transmit many instances of fourth fingerprint data, each corresponding with a different respective modifiable content-segment, to the fingerprint-matching server 106.

H. Operations Related to the Fingerprint-Matching Server Identifying an Upcoming Content-Modification Opportunity on the Identified Channel During a time-period T22, the fingerprint-matching server 106 can receive the third fingerprint data and the third metadata from the content-distribution system 102. As noted above, the third fingerprint data represents the third content transmitted by the content-distribution system 102 on the identified channel.

During a time-period T23, the fingerprint-matching server 106 can receive the fourth fingerprint data and the fourth metadata from the content-management system 108. As noted above, the fourth fingerprint data represents the modifiable content-segment.

During a time-period T24, the fingerprint-matching server 106 can compare at least a portion of the third fingerprint data with at least a portion of the fourth fingerprint data to determine whether there is a match.

During a time-period T25, based on the comparing, the fingerprint-matching server 106 can detect a match between the at least a portion of the third fingerprint data and the at least a portion of the fourth fingerprint data. The fingerprint-matching server 106 can compare and/or detect a match between fingerprint data using any content fingerprint comparing and matching process now known or later developed.

During a time-period T26, based on the detected match, the fingerprint-matching server 106 can determine that at least a portion of the modifiable content-segment is included within the third content, and therefore can identify an upcoming content-modification opportunity on the identified channel. For example, the fingerprint-matching server 106 can determine that at least a beginning portion of the MODIFIABLE CONTENT-SEGMENT is included within the THIRD CONTENT 320, as shown in FIG. 3, and therefore can identify an upcoming content-modification opportunity.

As noted above, the fingerprint-matching server 106 can receive third metadata, which can be the same as or similar to the first metadata. As such, the third metadata can be or include a transmission time-stamp and/or a channel identifier, for example. However, the third metadata can also be or include a position of at least a portion of the modifiable content-segment within the third content. In one example, the metadata can specify this using a starting frame marker and an ending frame marker, each corresponding with a respective frame of the third content. The fingerprint-matching server 106 can determine the starting frame marker and the ending frame marker based on the matching.

Notably, in practice, since there are likely to be multiple potential modifiable content-segments where portions thereof could be included within the third content, the fingerprint-matching server 106 is likely to compare at least a portion of the third fingerprint data with at least a portion of multiple instances of fourth fingerprint data (each representing a different respective instance of a modifiable content-segment), to determine which of those multiple instances of the fourth fingerprint data has a portion that matches the at least a portion of the third fingerprint data.

I. Operations Related to Preparing the Content-Presentation Device to Perform a Content-Modification Operation in Connection with the Identified Upcoming Content-Modification Opportunity During a time-period T27, based on the detected match, the fingerprint-matching server 106 can transmit the third fingerprint data and the third metadata to the content-presentation device 104 data to facilitate preparing the content-presentation device 104 to perform a content-modification operation in connection with the identified upcoming content-modification opportunity.

During a time-period T28, the content-presentation device 104 can receive the third fingerprint data and the third metadata from the fingerprint-matching server 106.

During a time-period T29, the content-presentation device 104 can receive content on the identified channel. This content is referred to herein as "fifth content." In one example, the fifth content is the FIFTH CONTENT 324 shown in FIG. 3.

For various reasons (e.g., due to a transmission delay associated with transmitting fingerprint data and metadata being shorter that the content-transmission delay), the content-presentation device 104 can receive the third fingerprint data and the third metadata from the fingerprint-matching server 106 before receiving the fifth content from the content-distribution system 102. In this way, the content-presentation device 104 can receive fingerprint data representing content that the content-presentation device 104 is expecting to receive shortly thereafter, and that the content-presentation device should actually receive shortly thereafter unless an interruption event (e.g., a channel-change event) occurs.

In practice, similar to how the content-distribution system 102 is likely to transmit the third content shortly after (e.g., immediately after or a few seconds or minutes after) transmitting the first content, the content-presentation device 104 is likely to receive the fifth content shortly after (e.g., immediately after or a few seconds or minutes after) receiving the second content.

During a time-period T30, the content-presentation device 104 can output for presentation at least a portion of the fifth content. For example, referring to FIG. 3, the content-presentation device can output for presentation the portion of the FIFTH CONTENT 324 that is the end portion of the PROGRAM SEGMENT A.

As noted above, in some situations, even though the content-presentation device 104 receives content from the content-distribution system 102, it can be desirable for the content-presentation device 104 to perform a content-modification operation so that the content-presentation device 104 can output for presentation alternative content instead of at least a portion of the received content.

As such, even though the content-presentation device 104 receives the fifth content and outputs for presentation at least a portion of the fifth content, it can be desirable for the content-presentation device 104 to perform a content-modification operation so that the content-presentation device 104 can also output for presentation alternative content instead of at least another portion (e.g., the remaining portion) of the fifth content. For example, referring to FIG. 3, it can be desirable for the content-presentation device 104 to replace at least a portion of the AD SEGMENT B with at least a portion of a different advertisement segment that is perhaps more targeted to the end-user. As another example, it can be desirable for the content-presentation device 104 to overlay on at least a portion of the AD SEGMENT B, overlay content that enhances at least a portion of the AD SEGMENT B in a way that is again perhaps more targeted to the end-user.

During a time-period T31, the content-presentation device 104 can generate fingerprint data representing the fifth content. This fingerprint data is referred to herein as "fifth fingerprint data." The content-presentation device 104 can generate the fifth fingerprint data using any content fingerprinting process now known or later developed. The content-presentation device 104 can generate the fifth fingerprint data at various rates, such as at the rate of one fingerprint per frame of the fifth content. The fifth fingerprint data can be or include some or all of these generated fingerprints.

Also during the time-period T31, the content-presentation device 104 can generate metadata associated with the fifth content and/or the fifth fingerprint data. This metadata is referred to herein as "fifth metadata."

The content-presentation device 104 can receive the fifth content, generate the fifth fingerprint data, generate the fifth metadata, associate the fifth fingerprint data with the fifth metadata in various ways, such as ways that are the same as or similar to those described above in connection with receiving the second content, generating the second fingerprint data, generating the second metadata, and associating the second fingerprint data with the second metadata.

As noted above, the content-presentation device 104 can receive the third fingerprint data from the fingerprint-matching server 106 and can generate the fifth fingerprint data.

During a time-period T32, the content-presentation device 104 can compare the third fingerprint data and the fifth fingerprint data to determine whether there is a match.

During a time-period T33, based on the comparing, the content-presentation device 104 can detect a match between the third fingerprint data and the fifth fingerprint data. In this disclosure, this type of match attempt, namely a match attempt between (i) reference fingerprint data representing content transmitted by the content-distribution system 102 on an identified channel (at least based on the most recent channel identification analysis), and (ii) query fingerprint data representing content being received by the content-presentation device 104 on the same identified channel, is referred to herein as a "hot match attempt." The content-presentation device 104 can compare and/or detect a match between fingerprint data using any content fingerprint comparing and matching process now known or later developed.

During a time-period T34, based on the detected match, the content-presentation device 104 can determine a time-point at which the identified upcoming modification opportunity starts. This is referred to herein as the "modification start-time." In one example, the modification start-time is the MODIFICATION START-TIME 326 as shown FIG. 3.

In one example, the content-presentation device 104 can determine the modification start-time by starting with the transmission time-stamp associated with the starting frame marker (which, as described above, can be or be included in the third metadata) and adding the content-transmission delay to that transmission time-stamp, to arrive at the modification start-time.

As another example, the content-presentation device 104 can determine the modification start-time by first establishing a synchronous lock between the third content, the third fingerprint data, and/or the third metadata on the one hand, and the fifth content, the fifth fingerprint data, and/or the fifth metadata, on the other hand. The content-presentation device 104 can establish the synchronous lock using any synchronous lock technique now known or later developed. An example synchronous lock technique is described in U.S. Pat. No. 10,506,275 issued Dec. 10, 2019, the entirety of which is hereby incorporated by reference herein. Another example synchronous lock technique is described in U.S. Pat. App. Pub. No. 2020/0029108 published Jan. 23, 2020, the entirety of which is hereby incorporated by reference herein.

The content-presentation device 104 can then determine the modification start-time by determining a time-period between (i) a current receipt time-stamp associated with a first portion of the fifth content that the content-presentation device 104 is currently receiving and (ii) based on the synchronous lock, an anticipated receipt time-stamp associated with a second portion of the fifth content that is the start of the modifiable content-segment, and then adding the determined time-period to the current receipt time-stamp, to arrive at the modification start-time.

Also during the time-period T34, based on the detected match, the content-presentation device 104 can determine a time-point at which the identified upcoming modification opportunity ends. This is referred to herein as the "modification end-time." In one example, the modification end-time is the MODIFICATION END-TIME 328 as shown FIG. 3.

In one example, the content-presentation device 104 can determine the modification end-time by starting with the modification start-time and adding the duration of the modifiable content-segment (which, as described above, can be or be included in the fourth metadata) to the modification start-time, to arrive at the modification end-time.

Notably, if the content-presentation device 104 performs a hot match attempt and does not detect a match, the content-presentation device 104 can determine that the content-presentation device 104 is no longer receiving content on the most recently identified channel. In response, the content-presentation device 104 can repeat one or more of the operations described above so that the fingerprint-matching server 106 can perform another cold match attempt, to attempt to identify the channel again.

During a time-period T35, the content-presentation device 104 can transmit a request for content for use in connection with performing the content-modification operation, to the content-management system 108. This content is referred to herein as "supplemental content." In one example, the content-presentation device 104 can transmit the request before the modification start-time (e.g., ten seconds before). In some cases, the request can include selection criteria for the supplemental content, which the content-presentation device 104 can determine based on the third metadata that the content-presentation device 104 receives from the fingerprint-matching server 106, for instance.

For example, the selection criteria can specify a requested type of content (e.g., a replacement content segment or overlay content), duration (e.g., 15 seconds, 30 seconds, or 60 seconds), aspect ratio (e.g., 4:3 or 16:9), and/or resolution (e.g., 720p or 1080p).

During a time-period T36, the content-management system 108 can receive the request and use it as a basis to select supplemental content from among multiple supplemental content items that are available for selection. In some cases, the content-management system 108 can receive and consider various data to help inform which supplemental content to select. For example, the content-management system 108 can receive historical content consumption data for the content-presentation device 104 from the data-management system 110 and/or the content-management system 108 can receive demographic data from a demographic data provider. The content-management system 108 can then use at least the received historical content consumption data and/or the received demographic data as a basis to select the supplemental content.

The content-management system 108 can cause the selected supplemental content to be transmitted to the content-presentation device 104. In one example, the content-management system 108 can do this by communicating with a supplemental-content delivery system 112 that can host the supplemental content. The supplemental-content delivery system 112 can take various forms and can include various components, such as a content distribution network (CDN).

During a time-period T37, the content-management system 108 can transmit a request for a link (e.g., a Uniform Resource Identifier (URI) or a Uniform Resource Locator (URL)) pointing to the hosted supplemental content, to the supplemental-content delivery system 112.

During a time-period T38, the supplemental-content delivery system 112 can receive and respond to the request for the link by transmitting the requested link to the content-management system 108.

During a time-period T39, the content-management system 108 can then in turn transmit the link to the content-presentation device 104.

During a time-period T40, the content-presentation device 104 can receive the link, which it can use to retrieve the supplemental content from the supplemental-content delivery system 112, such that the content-presentation device 104 can use the retrieved supplemental content in connection with performing the content-modification operation. In one example, the content-presentation device 104 can retrieve the supplemental content and store the supplemental content in a data-storage unit of the content-presentation device 104.

As such, in some examples, the content-presentation device 104 can receive the modifiable content-segment from one source (e.g., the content-distribution system 102), and the supplemental content from another source (e.g., the supplemental-content delivery system 112). These segments can be transmitted to, and received by, the content-presentation device 104 in different ways. For example, the content-distribution system 102 can transmit, and the content-presentation device 104 can receive, the modifiable content-segment as a broadcast stream transmission, whereas the supplemental-content delivery system 112 can transmit, and the content-presentation device 104 can receive, the supplemental content as an over-the-top (OTT) transmission. In this context, in one example, the content-distribution system 102 can receive the modifiable content-segment via one communication interface (e.g., an HDMI interface), and the content-presentation device 104 can receive the supplemental content via a different communication interface (e.g., an Ethernet or WI-FI interface).

J. Operations Related to the Content-Presentation Device Performing a Content-Modification Operation At a time-period T41, the content-presentation device 104 can perform the content-modification operation. The content-presentation device 104 can do this in various ways, perhaps depending on the type of content-modification operation to be performed.

In one example, the content-presentation device 104 performing a content-modification operation can involve the content-presentation device 104 modifying the modifiable content-segment by replacing it with supplemental content. This is referred to herein as a "content-replacement operation." For example, in this scenario, the content-presentation device 104 can receive a linear sequence of content segments that includes the modifiable content-segment and the associated metadata, and can also receive the supplemental content segment, as described above. The content-presentation device 104 can output for presentation the sequence of content segments up until the modification start-time (which corresponds to the start of the modifiable content-segment), at which time the content-presentation device 104 can switch to outputting for presentation the supplemental content instead. Then, at the modification end-time (which corresponds to the end of the modifiable content-segment), the content-presentation device 104 can switch back to outputting for presentation the content that follows in the linear sequence of content segments (or perhaps to other content, such as additional supplemental content that is replacing another modifiable content-segment).

In one example, the operation of the content-presentation device 104 switching from outputting the sequence of content segments to outputting the supplemental content can involve using various buffers of the content-presentation device 104. For example, this can involve the content-presentation device 104 switching from using first data in a first input buffer where the sequence of content segments is being received to using second data in a second input buffer where the supplemental content is being received, to populate a display buffer.

As such, according to one example as illustrated in FIG. 3, by performing a content replacement operation, the content-presentation device 104 can replace the AD SEGMENT B with the AD SEGMENT D. As a result, rather than outputting for presentation the RECEIPT SEQUENCE 304, the content-presentation device can instead output for presentation the FIRST MODIFIED SEQUENCE 306.

In another example, the content-presentation device 104 performing a content-modification operation can involve the content-presentation device 104 modifying a modifiable content-segment by overlaying on the modifiable content-segment, overlay content (referred to herein as a "content overlay operation"). For example, in this scenario, the content-presentation device 104 can again receive a linear sequence of content segments that includes the modifiable content-segment and the associated metadata, and the content-presentation device 104 can also receive the supplemental content, as described above.

The content-presentation device 104 can then output for presentation the modifiable content-segment as it ordinarily would, except that starting at the modification start-time, the content-presentation device 104 can start overlaying the supplemental content on the modifiable content-segment. The content-presentation device 104 can continue overlaying the supplemental content until the modification end-time. In this way, the content-presentation device 104 can overlay the supplemental content during at least some temporal portion of the modifiable content-segment.

In one example, the operation of the content-presentation device 104 overlaying supplemental content on the modifiable content-segment can involve using various buffers of the content-presentation device 104. For example, this can involve the content-presentation device 104 using a portion of first data in a first input buffer where the sequence of content segments is being received together with second data in a second input buffer where the supplemental content is being received, for the purposes of populating a display buffer. In this way, the content-presentation device can combine relevant portions of the modifiable content-segment (i.e., all portions except those representing region where the supplemental content is to be overlaid) together with the supplemental content to be used as an overlay, to create the desired modifiable content-segment plus the supplemental content overlaid thereon.

As such, according to one example as illustrated in FIG. 3, by performing a content overlay operation, the content-presentation device 104 can overlay supplemental content on the AD SEGMENT B, thereby modifying it to AD SEGMENT B'. As a result, rather than outputting for presentation the RECEIPT SEQUENCE 304, the content-presentation device can instead output for presentation the SECOND MODIFIED SEQUENCE 308.

In some examples, the content-presentation device 104 performs an entirety of a content-modification operation (e.g., a replacement or overlay action, as described above) while tuned to the channel on which the RECEIPT SEQUENCE 304 is received, unless an intervening event occurs that might cause the content-modification operation (or the output of the resulting content) to be stopped, such as a channel change or a powering down of the content-presentation device 104 and/or associated display device. Thus, the FIRST MODIFIED SEQUENCE 306 or SECOND MODIFIED SEQUENCE 308 can be output on the same channel on which the content-presentation device 104 is tuned—that is, the channel on which the modifiable content-segment is received and on which the content-modification opportunity was identified.

K. Tracking and Reporting Operation-Related Data

To help facilitate performance of various operations such as the content-presentation device 104 performing a content-modification operation and to help allow for the tracking and reporting of such operations, the content-modification system 100 and/or components thereof can track and report various operation-related data at various times and in various ways.

As just a few illustrative examples, responsive to certain operations being performed, such as those described herein, the fingerprint-matching server 106, the content-presentation device 104, and/or another entity can generate, store, and/or transmit messages that indicate (i) that a modifiable content-segment has been identified, (ii) that a channel has been identified/confirmed (perhaps based on a match detected as a result of a cold or hot match attempt), (iii) that an upcoming content-modification opportunity on the identified channel has been identified, (iv) that supplemental content has been requested, (v) that supplemental content has been received, (vi) that a content-modification operation has started, (vii) that a content-modification operation has ended, and/or (viii) that a scheduled content-modification operation was aborted and/or not performed for any given reason. In some cases, these messages can include other metadata related to these operations. For example, the metadata can specify relevant timing information, device identifiers, channel identifiers, content segment identifiers, etc.

L. Watermark-Based Techniques

Although this disclosure has described the content-modification system 100 using fingerprint-based technology to perform various operations and to provide various features, in some examples, the content-modification system 100 can use watermark-based techniques instead of, or in addition to, fingerprint-based techniques, to perform these and other operations and to provide these and other features.

For example, as an alternative to the fingerprint-based technique described above in which the fingerprint-matching server 106 identifies the channel on which the second content is being received by the content-presentation device 104, the content-distribution system 102 or another entity can insert a channel identifier in the form of a watermark into the second content, such that the fingerprint-matching server 106, the content-presentation device 104, or another entity can extract the channel identifier and use it to identify the channel on which the second content is being received by the content-presentation device 104.

In this context, the content-modification system 100 can employ any watermark technique now known or later developed.

M. Additional Operations Related to Performing a Content-Modification Operation

In some situations, the content-management system 108 can use broadcast schedule data to facilitate the content-presentation device 104 performing certain operations. These acts and related features will now be described.

In one example configuration, the content-management system 108 can access broadcast schedule data associated with a channel. In some configurations, this can involve the content-management system 108 accessing an industry standard coding identification (ISCI) key and/or a house identifier. The broadcast schedule data can be or include program log files (e.g., schedules that list when certain advertisements or other content will be broadcast) received from a content provider (e.g., a television programmer). In some examples, the broadcast schedule data can be accessed via a schedule notification interface such as Society of Cable Telecommunications Engineers 224 (SCTE 224) messaging. Further, in some examples, the broadcast schedule data can be accessed via direct integration of elements of the content-modification system 100 with a broadcast playout system associated with a content provider.

The content-management system 108 can use the accessed broadcast schedule data to identify an upcoming content-modification opportunity on the channel. In one example, this can involve the content-management system 108 (i) accessing first broadcast schedule data associated with the channel, (ii) extracting, from among the accessed first broadcast schedule data associated with the channel, second broadcast schedule data related to one or more broadcast-related events scheduled within a predefined upcoming duration, and (iii) using the extracted second broadcast schedule data to identify the upcoming content-modification opportunity on the channel.

In another example, the content-management system 108 using the accessed broadcast schedule data to identify an upcoming content-modification opportunity on the channel can involve the content-management system 108 (i) detecting a match between the accessed broadcast schedule data and reference data that corresponds with a reference modifiable content segment, and (ii) identifying the upcoming content-modification opportunity on the channel based at least in part on the detected match.

Responsive to identifying the upcoming-content-modification opportunity on the channel, the content-management system 108 can identify the content-presentation device 104 tuned to the channel. The content-management system 108 can cause supplemental content to be transmitted to the identified content-presentation device 104, to facilitate the content-presentation device 104 performing a content-modification operation related to the upcoming content-modification opportunity on the channel. The content-management system 108 can also transmit to the identified content-presentation device 104 reference fingerprint data to further facilitate the content-presentation device 104 performing the content-modification operation related to the upcoming content-modification opportunity on the channel.

The content-presentation device 104 can receive the supplemental content and can use the received supplemental content in connection with performing a content-modification operation related to the upcoming content-modification opportunity on the channel.

In practice, these features can be implemented in connection with multiple content presentation devices. In one configuration, responsive to identifying the upcoming content-modification opportunity on the channel, the content-management system 108 can identify a group of multiple content-presentation devices tuned to the channel. For each content-presentation device in the identified group, the content-management system 108 can then cause respective supplemental content to be transmitted to that content-presentation device, to facilitate that content-presentation device performing a respective content-modification operation related to the upcoming content-modification opportunity on the channel. The content-management system 108 (or another entity such as the fingerprint-matching server 106) can also transmit to that content-presentation device respective reference fingerprint data to further facilitate that content-presentation device performing the respective content-modification operation related to the upcoming content-modification opportunity on the channel.

In some instances, the content-presentation device 104 can determine that it did not receive the modifiable-content segment related to the content-modification opportunity, which can happen due to broadcast schedule slippage or because another entity (e.g., a set-top box) already replaced the modifiable-content segment with supplemental content, for instance. The content-presentation device 104 can determine this in various ways (e.g., based on compared fingerprint data). Responsive to detecting this, the content-presentation device 104 can refrain from or stop performing (e.g., abort) the content-modification operation. However, as another option, the content-presentation device 104 can replace this supplemental content with other supplemental content.

N. Content-Modification Operations Performed by a Tuner Device Connected to a Content-Presentation Device In line with the discussion above, when there is an upcoming content-modification opportunity, a content-presentation device can be scheduled to replace a modifiable content-segment with first supplemental content at a modification start-time. However, before the scheduled modification start-time and at the instruction of an MVPD, a tuner device connected to the content-presentation device might replace the modifiable content-segment with second supplemental content, different from the first supplemental content. Thus, the linear sequence of content segments that the content-presentation device receives from the tuner device can include the second supplemental content instead of the modifiable content-segment that the content-presentation device is expecting to receive.

Figure 5:
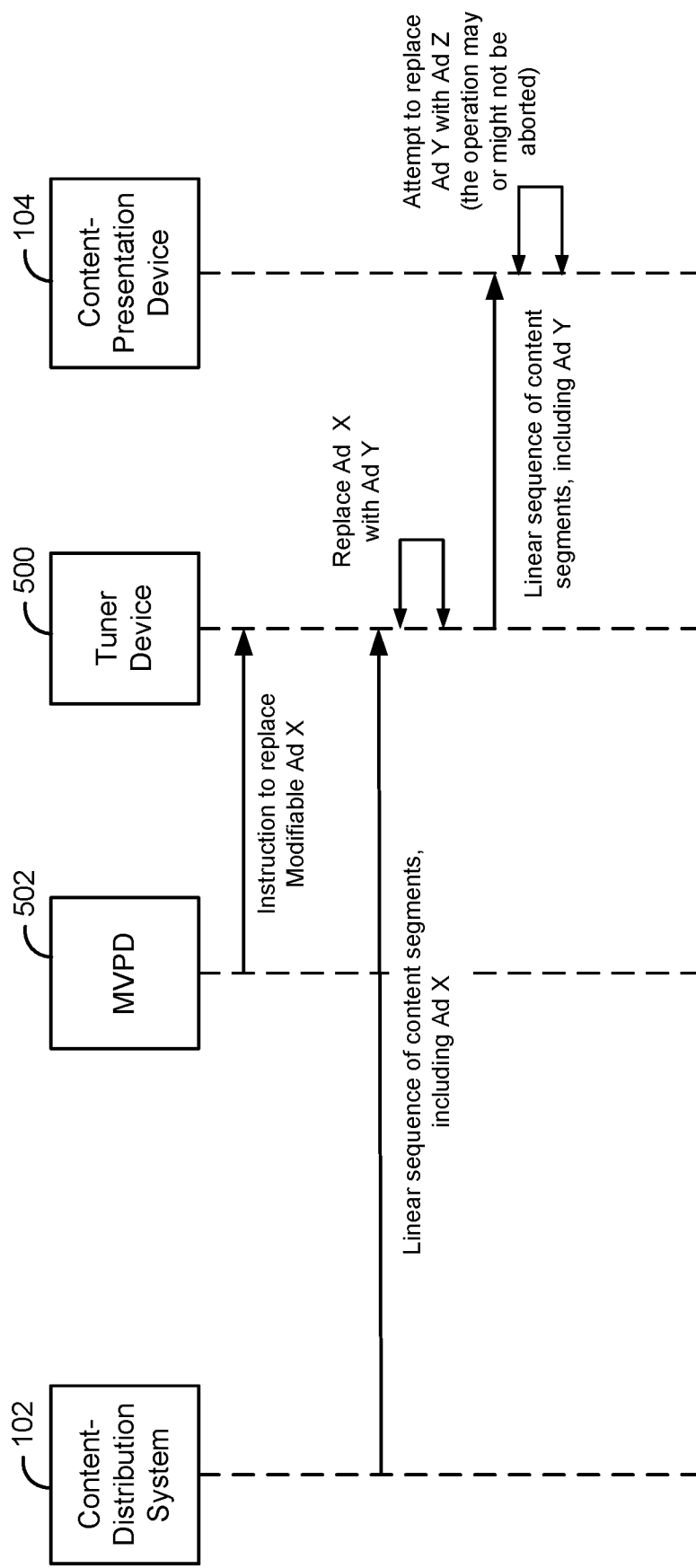
FIG. 5 is a sequence diagram of operations that can be performed when a tuner device performs a content-modification operation at the request of a content distributor.

FIG. 5 is a sequence diagram depicting an example of this situation. The tuner device 500 can receive an instruction from MVPD 502 to replace an upcoming Modifiable Advertisement X, and can carry out the replacement (e.g., with Advertisement Y) upon receipt of a linear sequence of content segments (including Modifiable Advertisement X) from the content-distribution system 102. The content-presentation device 104 thus receives the linear sequence of content segments, but with Advertisement Y instead of Modifiable Advertisement X. By that point in time, however, the content-presentation device 104 may have already sent a request to the content-management system 108 (not shown) for supplemental content for use in replacing Modifiable Advertisement X at a modification start-time, and may have already received Advertisement Z in response to the request.

As discussed above, the content-presentation device's 104 might begin replacing Advertisement Y with Advertisement Z at the modification start-time. But as a result of the aforementioned events, the content-presentation device 104 can determine a short time (e.g., a few seconds) after the modification start-time that there is a mismatch between the reference fingerprint data representing Modifiable Advertisement X and the query fingerprint data representing the content received from the tuner device 500 (i.e., Advertisement Y). In response to detecting the mismatch, the content-presentation device 104 can stop performing the content-replacement operation, which can cause the display of Advertisement Z to abruptly end after a few seconds worth of frames, thus resuming display of Advertisement Y, thereby resulting in an undesirable user experience.

As noted above, in some situations, the content-presentation device 104 might not stop performing the replacement operation and instead can complete the content-replacement operation, thus replacing Advertisement Y with Advertisement Z. However, this can be undesirable too in some situations, such as for an advertiser associated with Advertisement Y.

O. Operations Related to Detecting and Responding to a Content Modification Performed by a Tuner Device The disclosed methods and systems address the above-noted issues and can advantageously help the content-modification system 100 identify situations in which the tuner device 500 has performed a content-modification operation with higher confidence and respond accordingly. The disclosed methods and systems can also advantageously improve user experience during content-modification operations such as content-replacement operations.

Examples of the disclosed features and related features will now be described. Although example operations will be described herein primarily as being performed by a content-presentation device 104 and a fingerprint-matching server 106, other entities of the content-modification system 100, such as the content-management system 108, could perform one or more of such operations in alternative embodiments.

Furthermore, although example operations will be described herein primarily as involving performance of content-replacement operations by content-presentation devices and tuner devices, other types of content-modification operations are possible as well, such as content-overlay operations. In addition, although example operations will be described as primarily involving tuner devices associated with MVPDs, such tuner devices could be associated with other types of content distributors.

As discussed above, the content-presentation device 104 can be scheduled to perform, at a modification start-time, a content-modification operation that comprises modifying a modifiable content-segment that the content-presentation device 104 is scheduled to receive.

At some point before the modification start-time, the content-presentation device can receive reference fingerprint data representing the modifiable content-segment. For example, after a hot match is found, the fingerprint-matching server 106 can send, to the content-presentation device 104, reference fingerprint data representing content on the channel that the content-presentation device 104 is tuned to, and at least a portion of the reference fingerprint data can represent the modifiable content-segment. The content-presentation device 104 can also generate query fingerprint data representing content received by the content-presentation device 104 from the tuner device 500 connected to the content-presentation device 104. As noted above, the tuner device 500 can be a STB or other type of tuner device that is not part of the content-modification system 100 and that is associated with an MVPD, such as MVPD 502. An example of such a tuner device can be a Comcast® STB.

In some examples, the content-modification operation can be a content-replacement operation in which the content-presentation device 104 is scheduled to replace the modifiable content-segment with first supplemental content that the content-presentation device 104 will request. If the tuner device 500 has performed a content replacement instead, however, the query fingerprint data that the content-presentation device 104 generates can represent second, different supplemental content with which the tuner device 500 has performed a content-replacement operation or a content-overlay operation before the modification start-time. In other examples, the content-modification operation can be a content-overlay operation in which the content-presentation device 104 is scheduled to overlay first supplemental content over the modifiable content-segment and the query fingerprint data can represent second, different supplemental content with which the tuner device 500 has performed a content-replacement operation or a content-overlay operation before the modification start-time.

As further discussed above, the content-presentation device 104 can make a comparison of the received reference fingerprint data with the generated query fingerprint data. If the tuner device 500 has performed a content-modification operation at the instruction of MVPD 502, such as by replacing the modifiable content-segment with supplemental content (e.g., a replacement advertisement), the query fingerprint data might not match the received reference fingerprint data.

Thus, based on the comparison, the content-presentation device 104 may detect, within a predefined time period after the modification start-time and during performance of the content-modification operation, a mismatch between the reference fingerprint data and the query fingerprint data. A mismatch that is detected within the predefined time period after the modification start-time and during performance of the content-modification operation will be hereinafter alternatively referred to as a "first mismatch." In some examples, the predefined time period can be a value in a range of 1 to 4 seconds. Other time periods are possible as well.

The predefined time period can be a mechanism for distinguishing between situations in which the content-presentation device 104 performs a hot match attempt and does not detect a match because the tuner device 500 has performed a content-modification operation before the modification start-time and situations in which the content-presentation device 104 performs a hot match attempt and does not detect a match because the content-presentation device 104 is no longer receiving content on the most recently identified channel (e.g., due to a channel-change event). In the former situations, the content-presentation device 104 may be more likely to detect a mismatch between query and reference fingerprints data within a short time period after the modification start-time, such within less than 5 seconds from the modification start-time, whereas, in the latter situations, the content-presentation device 104 may be more likely to detect a mismatch between query and reference fingerprint data after a longer time period from the modification start-time, such as after 5 seconds from the modification start-time or longer.

Thus, in response to the content-presentation device 104 detecting the first mismatch, the content-presentation device 104 can perform an action (hereinafter alternatively referred to as the "first action," to distinguish performance of this action from other actions described herein). That is, the content-presentation device 104 (and, likewise, one or more other computing systems of the content-modification system 100, as described in more detail below) can be configured to perform one or more particular first actions based at least in part on the first mismatch having been detected. Examples of these first actions will be described in more detail below.

Furthermore, because the disclosed methods and systems distinguish between situations in which a mismatch is detected because a tuner device has performed a content-modification operation before the modification start-time and situations in which a mismatch is detected due to another type of occurrence such as a channel-change event, a mismatch that was detected within the predefined time period (and is thus because the tuner device 500 has performed a content-modification operation at the instruction of a content distributor) can be interpreted by the content-presentation device 104 and/or other computing systems of the content-modification system 100 as a mismatch that was not the result of a channel-change event.

In some examples, if the content-presentation device 104 remains tuned to the channel before the modification start-time, the content-presentation device 104 can, at a predefined time-point before the modification start-time (e.g., a few seconds or less), generate and send to the fingerprint-matching server 106 a message (e.g., a clip start indication) that indicates to the fingerprint-matching server 106 that the content-presentation device 104 has been tuned to the channel up to right before the modification start-time. In such examples, the content-presentation device 104 can be configured to perform the first action in accordance with the disclosed methods and systems further in response to generating and sending the message.

Example first actions that can be performed in response to at least the detection of the first mismatch within the predefined time period (e.g., within one second) after the modification start-time and during performance of the content-modification operation will now be described in more detail. The first action that is performed can be or include one or more of the following first actions.

As an example, the act of performing the first action can be or include continuing performance of the content-modification operation until the content-modification operation is complete. That is, the content-presentation device 104 can override the result of the tuner device's 500 content-modification operation. For instance, if the tuner device 500 replaced the modifiable content-segment with a first advertisement, and the content-presentation device 104 begins replacing the first advertisement with a second, different advertisement, the content-presentation device 104 can continue the replacement such that the entirety of the second advertisement is presented for display instead of the first advertisement.

As another example, the act of performing the first action can be or include aborting the content-modification operation before the content-modification operation is complete. That is, the content-presentation device 104 aborts performance of a partially-performed content-modification operation related to the identified content-modification opportunity on the channel to which the content-presentation device 104 is tuned.

As yet another example, the act of performing the first action can be or include transmitting, to the fingerprint-matching server 106, a notification that the content-presentation device 104 has detected the first mismatch within the predefined time period after the modification start-time and during performance of the content-modification operation. Receipt of the notification by the fingerprint-matching server 106 can facilitate the fingerprint-matching server 106 determining that the first mismatch is due to the tuner device 500 having modified the modifiable content-segment before the modification start-time, and, as described in more detail below, can facilitate the fingerprint-matching server 106 performing various actions in response to receiving the notification. Further, in line with the discussion above, the fingerprint-matching server 106 can be configured to interpret receipt of the notification as an indication that the first mismatch was not the result of a channel-change event. This action may be performed in addition to continuing or aborting the content-modification operation.

As yet another example, the act of performing the first action can be or include transmitting, to the fingerprint-matching server 106, an indication that the content-presentation device 104 is receiving content on the channel. This transmitted indication can take the form of the notification described above, or can be a separate indication that is transmitted. The fingerprint-matching server 106 can be configured to interpret receipt of the indication as an indication that the first mismatch was not the result of a channel-change event. This first action may be performed in addition to continuing or aborting the content-modification operation.

In some embodiments, the content-presentation device 104 can take into account additional or alternative factors as a basis for performing the first action.

For example, the content-presentation device 104 can use automatic content recognition (ACR) data and/or other techniques to identify a footprint of the MVPD 502 and use the detection of the footprint as an additional or alternative basis for performing the first action. To facilitate this, for instance, the content-presentation device 104 can include an ACR module configured to generate ACR data (e.g., fingerprint data and/or watermarks) representing content presented by the content-presentation device 104 and viewed by an end-user on one or more channels, including content received from the tuner device 500.

The content-presentation device 104 can then determine whether at least a portion of the ACR data identifies the MVPD 502.

For example, the content-presentation device 104 can compare the ACR data to a channel lineup associated with the MVPD 502 and determine whether there is a match. As a more particular example, the content-presentation device 104 can compare the ACR data to one or more channel lineups, and/or other broadcast schedule data, associated with the MVPD 502 and other content distributors. To facilitate this, the content-presentation device 104 can access or locally store data that maps each of a plurality of identifiers of content distributors to a respective channel lineup.

The ACR data can include viewing data that the content-modification system 100 has determined to be associated with a particular subset of channels. Thus, the content-presentation device 104 can determine an identity of the MVPD 502 and that the content-presentation device 104 is connected to a tuner device associated with the MVPD 502 based at least in part on the particular subset of channels being part of one of the one or more channel lineups. The content-presentation device 104 can then responsively perform the first action.

As another example, the content-presentation device 104 can detect, based on the ACR data, the presence of one or more static user interface elements that the content-presentation device 104 displays and that known to be associated with a particular tuner device and/or with a particular MVPD (e.g., MVPD 502). Examples of such static user interface elements can include a logo for the MVPD 502 (e.g., on a boot-up screen for the tuner device 500 or elsewhere as part of the graphical user interface provided by the tuner device 500), a TV guide layout, channel menu layout, other menu layout, or a boot-up screen layout. More particularly, the content-presentation device 104 can refer to data that stores, for each of a plurality of tuner devices and/or MVPDs, corresponding known logos, templates of guide layouts, channel menu layouts, etc., and/or other static user interface elements, and can determine whether the data matches at least a portion of the ACR data. In response to detecting a match, the content-presentation device 104 can perform the first action, because the detected match can indicate to the content-presentation device 104 that the content-presentation device 104 is receiving content from a particular tuner device and/or MVPD that corresponds to the detected static user interface elements. Further, in some examples, the technique described above can be used to detect a match between at least a portion of the ACR data and one or more dynamic user interface elements that identify the MVPD 502. Such user interface elements can take the form of a user interface element that moves (e.g., rotates, blinks, fades-in, fades-out), such as an animated logo for the MVPD 502.

As yet another example, there may be situations in which an MVPD 502 is required or encouraged to watermark any supplemental content that is used for a content-modification operation performed by the tuner device 500 at the request of the MVPD 502. In these and other situations, the content-presentation device 104 can determine, within the predefined time period after the modification start-time and during performance of the content-modification operation, that at least a portion of the content that was received by the content-presentation device 104 from the tuner device 500 and that is being modified as part of the content-modification operation includes a watermark associated with a content distributor (e.g., MVPD 502), such as a video watermark and/or an audio watermark. The act of performing the first action can thus be performed in response to or further in response to this determination. This can increase the confidence with which the content-modification system 100 identifies a situation in which the tuner device 500 has performed a content-modification operation. Further, the performed first action in this situation can be or include transmitting an indication to the fingerprint-matching server 106 that the content-presentation device 104 detected the watermark associated with the MVPD 502. The determination of the presence of a watermark in the embodiments described above can be performed using any technique now known or later developed.

In some embodiments, the content-presentation device 104, the fingerprint-matching server 106, and/or other computing systems of the content-modification system 100 can receive a list of modifiable content-segments that have been made available to a MVPD or other content distributor, such as a list of advertisements on a content provider's (e.g., television programmer) 14 minutes of advertisement inventory, for instance. In such embodiments, the content-presentation device 104 might perform the first action further in response to a determination (e.g., made by the content-presentation device 104 or another computing system of the content-modification system 100) that the list includes the modifiable content-segment that the content-presentation device 104 was expecting to receive in connection with the identified upcoming content-modification opportunity. Thus, if the content-presentation device 104 was expecting a modifiable content-segment that was made available to MVPDs and sees that it received different content from the tuner device 500, the content-presentation device 104 can determine with higher confidence that the tuner device 500 has performed a content-modification operation before the modification start-time.

The disclosed methods and systems also include operations that the fingerprint-matching server 106 can perform in accordance with the above-described operations that the content-presentation device 104 performs. These operations will now be described in greater detail. Further, although the operations will be described primarily as being performed by the fingerprint-matching server 106, other entities of the content-modification system 100, such as the content-management system 108 or the data-management system 110, could perform one or more of such operations in alternative embodiments.

The fingerprint-matching server 106 can determine that the content-presentation device 104 has detected the above-described first mismatch within the predefined time period after the modification start-time and during performance of the content-modification operation. For example, the fingerprint-matching server 106 can make this determination based on the notification and/or other indication message described above that the fingerprint-matching server 106 receives from the content-presentation device 104.

Further, the fingerprint-matching server 106 can be configured to interpret this determination as a determination that the first mismatch is due to the tuner device 500 having modified the modifiable content-segment before the modification start-time and, in response to determining that the first mismatch is due to the tuner device 500 having modified the modifiable content-segment before the modification start-time, the fingerprint-matching server 106 can perform an action (hereinafter alternatively referred to as the "second action," to distinguish performance of this action from the first action described above with respect to the content-presentation device 104). The second action can be or include one or more of the following actions.

As an example, the act of performing the second action can be or include performing an action that facilitates the content-presentation device 104 continuing performance of the content-modification operation until the content-modification operation is complete. In some instances, performance of an action that facilitates the content-presentation device 104 continuing performance of the content-modification operation until the content-modification operation is complete can take the form of performing no action that would cause the content-presentation device 104 to abort the content-modification operation. Alternatively, the fingerprint-matching server 106 can transmit, to the content-presentation device 104, an instruction to continue performance of the content-modification operation until the content-modification operation is complete.

As another example, the act of performing the second action can be or include performing an action that facilitates the content-presentation device 104 aborting performance of the content-modification operation before the content-modification operation is complete. For instance, the fingerprint-matching server 106 can send an instruction to the content-presentation device 104 to abort performance of a partially-performed content-modification operation related to the identified content-modification opportunity on the channel to which the content-presentation device 104 is tuned.

As yet another example, the act of performing the second action can be or include performing a fingerprint comparison other than a cold match attempt, in order to more quickly confirm that the content-presentation device 104 is still on the channel after either the content-presentation device 104 or the tuner device 500 completes its respective content-modification operation. For example, as opposed to a cold match attempt in which the fingerprint-matching server 106 compares query fingerprint data from the content-presentation device 104 against a large amount of reference fingerprint data associated with content from a large amount of channels, the fingerprint-matching server 106 might first attempt to match the query fingerprint data against reference fingerprint data from the channel, thus effectively assuming that the content-presentation device 104 did not change channels after the content-modification operation, and thus increasing the likelihood of detecting a match more quickly if the content-presentation device 104 did not change channels. In some situations, if no such match is detected, the fingerprint-matching server 106 can begin comparing the query fingerprint data to reference fingerprint data associated with a more-limited set of channels, such as other channels known to be part of MVPD's 502 channel lineup.

As yet another example, the act of performing the second action can be or include storing, in memory, an indication that the first mismatch is due to the tuner device 500 having modified the modifiable content-segment responsive to an instruction from the MVPD 502. Additionally or alternatively, the fingerprint-matching server 106 can store, in memory, metadata identifying the content-presentation device 104 and/or the tuner device 500, such as an Internet protocol (IP) address (e.g., a public IP address of the household to which the content-presentation device 104 tuner device 500 belongs), a device identifier of the content-presentation device 104, a device identifier of the tuner device 500, a hashed version of the IP address and/or the device identifier of the content-presentation device 104, a hashed version of the IP address and/or the device identifier of the tuner device 500, and/or other information associated with a household to which the content-presentation device 104 and/or the tuner device 500 belongs, such as a geolocation of the content-presentation device 104, a geolocation of the tuner device 500, demographic information, etc. In some situations, the notification that the fingerprint-matching server 106 receives from the content-presentation device 104 can include the device identifier, hashed IP address, etc. for the content-presentation device 104.

In practice, the historical content consumption data can be considered as a basis for selecting supplemental to deliver to a content-presentation device for content-modification operations, or for determining whether to dedicate computational resources to selecting and delivering supplemental content to a content-presentation device for content-modification operations, among other uses. Thus, it can be important that the historical content consumption data accurately reflect the content that a content-presentation device presents and that content-presentation device's associated tendency to change channels.

Accordingly, as yet another example, the act of performing the second action can be or include updating historical content consumption data associated with the content-presentation device 104 to indicate that the content-presentation device 104 is receiving content on the channel and has not changed channels. For instance, the fingerprint-matching server 106 can update the historical content consumption data to indicate, for each content-presentation device, a time period during which the content-presentation device was receiving content on the channel. In some examples, the act of updating the historical content consumption data to indicate that the content-presentation device 104 is receiving content on the channel and has not changed channels can involve the fingerprint-matching server 106 deciding not to update the historical content consumption data to indicate that the content-presentation device 104 has changed channels, despite receiving a notification indicating that the first mismatch was detected.

As yet another example, the act of performing the second action can be or include updating a counter (e.g., stored in a database) representing a total number of content-presentation devices that are connected to tuner devices and/or adding a device identifier associated with the content-presentation device 104 to a list of the total number of content-presentation devices that are connected to tuner devices. As will be discussed in more detail below, this can help the fingerprint-matching server 106 and/or other entities of the content-modification system 100 take actions with respect to groups of content-presentation devices, specifically taking into account whether such content-presentation devices are connected to tuner devices and thus whether such tuner devices are likely to perform content-modification operations at the instruction of MVPDs. Other benefits are possible as well.

In some embodiments, the fingerprint-matching server 106 can take into account additional or alternative factors as a basis for performing the second action, including but not limited to any of the factors described above with respect to the content-presentation device 104.

For example, the fingerprint-matching server 106 can determine that a list of modifiable content-segments includes the modifiable content-segment that the content-presentation device 104 was expecting to receive in connection with the identified upcoming content-modification opportunity. The fingerprint-matching server 106 can make this determination in the same or similar manner as described above with respect to the content-presentation device 104. The act of performing the second action can thus be performed in response to or further in response to this determination.

As another example, the fingerprint-matching server 106 can receive, from the content-presentation device 104, the ACR data described above, and can use the ACR data as described above to determine whether at least a portion of the ACR data identifies the MVPD 502. The act of performing the second action can thus be performed in response to or further in response to this determination.

As yet another example, the fingerprint-matching server 106 can use mapping data as a factor. In particular, mapping data that maps the content-presentation device 104 to the tuner device 500 can increase the confidence with which the content-modification system 100 determines that the tuner device 500 performed a content-modification operation before the modification start-time, and can additionally can increase the confidence with which the content-modification system 100 determines that the tuner device 500 is likely to perform other such content-modification operations again in the future. The mapping data can be determined by the fingerprint-matching server 106 and/or by the content-management system 108, using various techniques, including but not limited to the techniques described in U.S. patent application Ser. No. 17/146,569, filed Jan. 12, 2021, the entirety of which is hereby incorporated by reference herein. The mapping data can also usefully act as a representation of various households, each household having a particular number of content-presentation devices, one or more of which may be connected to a tuner device). Consideration of whether tuner devices are present in such households can also help the fingerprint-matching server 106 and/or other entities of the content-modification system 100 take actions with respect to groups of content-presentation devices.

Operations related to detecting and responding to content-modification operations performed by groups of tuner devices connected to associated content-presentation devices will now be described in more detail.

In particular, the fingerprint-matching server 106 can identify a group of multiple content-presentation devices that are tuned to the same channel and that are each scheduled to perform, at a modification start-time, a respective content-modification operation that comprises modifying a modifiable content-segment in connection with an upcoming content-modification opportunity on the channel. Each such content-presentation device can be identified using any of the techniques described herein.

The fingerprint-matching server 106 can then determine that, after the modification start-time, at least a subgroup of the group of content-presentation devices have detected a mismatch between reference fingerprint data representing the modifiable content-segment and query fingerprint data representing content received by at least the subgroup of content-presentation devices. This particular mismatch will be hereinafter alternatively referred to as a "second mismatch." Compared to the embodiments described above in which the detected first mismatch is a mismatch that is specifically detected within a predefined time window that content-presentation devices can be configured to use, the second mismatch can, in some instances, be a mismatch that is detected at any time-point after the modification start-time and during performance of the content-modification operation, or can be a mismatch that is detected within a different predefined time window (e.g., within six seconds after the modification start-time).

In some embodiments, the fingerprint-matching server 106 can determine that at least the subgroup of content-presentation devices have detected the second mismatch based on receiving, from each such content-presentation device, a notification or other indication that the second mismatch was detected. However, because the second mismatch might not be a mismatch detected within the predefined time window described above in some instances, the fingerprint-matching server 106 might not be configured to interpret receive of such notifications as indications that the content-presentation devices from which the notifications were received are connected to tuner devices that may have caused the second mismatches.

In an example scenario, the fingerprint-matching server 106 can identify a group of one hundred content-presentation devices tuned to the same channel and scheduled to perform content-modification operations, and can receive notifications from a subgroup of eighty of those content-presentation devices that have each detected a second mismatch. In another example scenario, one hundred content-presentation devices can be in the identified group, and the fingerprint-matching server 106 can receive notifications from all one hundred of the content-presentation devices.

The fingerprint-matching server 106 can then determine that at least the subgroup of content-presentation devices are connected to tuner devices associated with the same content distributor (e.g., MVPD 502). Phrased another way, the fingerprint-matching server 106 can determine that at least some of the content-presentation devices in the group are connected to tuner devices that are within the same MVPD footprint.

The fingerprint-matching server 106 can make this determination in various ways, including but not limited to some of the techniques described above, such as the techniques for matching ACR data to channel lineups and/or static user interface elements, for example. In particular, for each particular content-presentation device of at least the subgroup of content-presentation devices, the fingerprint-matching server 106 can (i) receive (e.g., from the particular content-presentation device) ACR data representing content received by the particular content-presentation device from a respective one of the tuner devices and that identifies the content distributor and (ii) detect a match between at least a portion of the ACR data and one or more of (a) a channel lineup (and/or other broadcast schedule data) associated with the content distributor or (b) one or more static (and/or dynamic) user interface elements associated with the content distributor. To facilitate a comparison of the ACR data with a channel lineup, the fingerprint-matching server 106 can access or locally store data that maps each of a plurality of identifiers of content distributors to a respective channel lineup, for instance.

As another example, the act of determining that at least the subgroup of content-presentation devices are connected to tuner devices associated with the same content distributor can involve, for each particular content-presentation device of at least the subgroup of content-presentation devices, (i) determining, based on historical content consumption data associated with the particular content-presentation device, a set of one or more channels on which the particular content-presentation device has received content, and (ii) determining that the set of channels matches at least a portion of a channel lineup (and/or other broadcast schedule data) associated with the content distributor. To facilitate this, for instance, the fingerprint-matching server 106 can use the above-noted data that maps each of a plurality of identifiers of content distributors to a respective channel lineup. In some embodiments, the fingerprint-matching server 106 can limit the set of one or more channels to include one or more channels on which the particular content-presentation device has received content within a predefined time period, such as one day, one week, or one month.

As yet another example, the act of determining that at least the subgroup of content-presentation devices are connected to tuner devices associated with the same content distributor can involve, for each particular content-presentation device of at least the subgroup of content-presentation devices, receiving, from the particular content-presentation device, an indication that at least a portion of the content that was received by the particular content-presentation device from a tuner device and that is being modified as part of the particular content-presentation device's scheduled content-modification operation includes a watermark associated with the MVPD 502. Other examples are possible as well.

In response to determining that at least the subgroup of content-presentation devices are connected to tuner devices associated with the same content distributor, the fingerprint-matching server 106 can perform an action (hereinafter alternatively referred to as the "third action," to distinguish performance of this action from the first and second actions described above). The third action can be or include one or more of the following actions.

As an example, the act of performing the third action can be or include performing an action that facilitates at least the subgroup of content-presentation devices continuing performance of the content-modification operations until the content-modification operations are complete. For instance, for each particular content-presentation device of at least the subgroup of content-presentation devices, the fingerprint-matching server 106 can perform a respective action that facilitates that particular content-presentation device continuing performance of that particular content-presentation device's respective content-modification operation.

Further, in some situations, the remaining content-presentation devices of the group may continue to perform respective content-modification operations uninterrupted by the fingerprint-matching server 106, unless one or more of such content-presentation devices detect and report mismatches that are not known to be associated with tuner devices performing content-modification operations, in which case the one or more content-presentation devices can abort performance of their respective content-modification operations before the content-modification operations are complete. That is, content-presentation devices that receive the originally-scheduled broadcasted content can continue performance of their content-modification operations, content-presentation devices that detect second mismatches and are determined to be connected to tuner devices associated with the same content distributor (e.g., within the same MVPD footprint) can continue performance of their content-modification operations, but content-presentation devices that detect second mismatches but are connected to tuner devices associated with a different content distributor or otherwise are determined not to be associated with that same content distributor can be directed to, or may automatically, abort performance of their respective content-modification operations before those content-modification operations are complete.

As another example, the act of performing the third action can be or include performing an action that facilitates at least the subgroup of content-presentation devices aborting performance of the content-modification operations before the content-modification operations are complete. For instance, for each particular content-presentation device of at least the subgroup of content-presentation devices, the fingerprint-matching server 106 can perform a respective action that facilitates that particular content-presentation device aborting performance of that particular content-presentation device's respective partially-performed content-modification operation.

As yet another example, the act of performing the third action can be or include updating historical content consumption data associated with at least the subgroup of content-presentation devices to indicate that at least the subgroup of content-presentation devices are receiving content on the channel and have not changed channels. For instance, the fingerprint-matching server 106 can update the historical content consumption data to indicate, for each content-presentation device, a time period during which the content-presentation device was receiving content on the channel. In some examples, the act of updating the historical content consumption data to indicate that at least the subgroup of content-presentation devices are receiving content on the channel and have not changed channels can involve the fingerprint-matching server 106 deciding not to update the historical content consumption data to indicate that at least the subgroup of content-presentation devices have changed channels, despite receiving notifications indicating that the second mismatch was detected for each such content-presentation device.

As indicated above, this can be useful because it can help the historical content consumption data accurately reflect the content that content-presentation devices present and those content-presentation devices' associated tendencies to change channels.

In some embodiments, the fingerprint-matching server 106 can take into account additional or alternative factors as a basis for performing the third action, including but not limited to the examples described above. For instance, the fingerprint-matching server 106 can perform the third action in response to making a determination that the modifiable-content segment that the group of content-presentation devices are planning to modify in accordance with the upcoming content-modification opportunity is one of a list of modifiable content-segments that have been made available to a MVPD or other content distributor.

As another example, the fingerprint-matching server 106 can be configured to determine that at least the subgroup of content-presentation devices are located within the same geographic area associated with the content distributor—that is, to determine that the second mismatches are occurring within a particular geographic area—and can use the result of the determination to cause performance of the third action. For instance, the MVPD 502 might be an MVPD that serves a plurality of tuner devices located in a particular geographic area, such as a city or county. Thus, if the fingerprint-matching server 106 determines that the tuner devices that are performing content-modification operations and causing the second mismatches to occur are all within the MVPD's 502 geographic footprint, the fingerprint-matching server 106 can perform a particular third action with respect to each of those content-presentation devices, such as by helping each content-presentation device in that geographic footprint continue performance of its respective content-modification operation. Knowledge of a geographic area in which an MVPD operates can also improve the confidence with which the fingerprint-matching server 106 performs actions relative to future content-modification operations as well, because a household being within the geographic area can increase the likelihood of that household including a tuner device associated with the MVPD that operates in the geographic area.

Additionally or alternatively, the fingerprint-matching server 106 can decide which third action to perform based on how many content-presentation devices detected a second mismatch (e.g., based on how many notifications of the detected second mismatches the fingerprint-matching server 106 receives). In some examples, for instance, the fingerprint-matching server 106 can determine that at least the subgroup of content-presentation devices that detected the second mismatch make up at least a threshold percentage of the group of content-presentation devices and, in response to this determination, the fingerprint-matching server 106 can perform a third action that facilitates at least the subgroup of content-presentation devices aborting performance of the content-modification operations before the content-modification operations are complete. The threshold percentage can be a value in a range of 90% to 100%, or can be another value outside of that range. In a more specific example, if the fingerprint-matching server 106 determines that at least 90% of the group detected the second mismatch, the fingerprint-matching server 106 can instruct at least the 90% of content-presentation devices to abort their respective content-modification operations before those content-modification operations are complete. In some instances, if the threshold percentage is met or exceeded, the fingerprint-matching server 106 can instruct the entire group of content-presentation devices to abort their respective content-modification operations.

In other examples, the fingerprint-matching server 106 can determine that at least the subgroup of content-presentation devices that detected the second mismatch make up less than the threshold percentage (or a threshold percentage different from the one described above) of the group of content-presentation devices and, in response to this determination, the fingerprint-matching server 106 can perform a third action that facilitates at least the subgroup of content-presentation devices continuing performance of the content-modification operations until the content-modification operations are complete. In a more specific example, if the fingerprint-matching server 106 determines that less than 90% of the group detected the second mismatch, such as 50% of the group, the fingerprint-matching server 106 can facilitate at least the 50% of content-presentation devices continuing their respective content-modification operations until the content-modification operations are complete. In some instances, if the number falls below the threshold percentage, the fingerprint-matching server 106 can instruct the entire group of content-presentation devices to continue their respective content-modification operations.

One reason it may be desirable to abort the content-modification operations when at least the subgroup of content-presentation devices that detected the second mismatch makes up a higher (e.g., 90% or above) percentage of the group of content-presentation devices is that such a high percentage can be indicative of the second mismatches having been due not to tuner device interference, but rather due to a content provider changing the broadcasted content without updating the broadcast schedule data. For instance, a content programmer might have decided to run a different advertisement instead of the modifiable content-segment without informing the content-modification system 100. However, one or more of the techniques described above (e.g., the predefined time window) can be used to increase the confidence with which the fingerprint-matching server 106 is aware of which (if any) content-presentation devices are connected to tuner devices, and whether such tuner devices are responsible for the detected mismatches.

Along these lines, in some embodiments, the fingerprint-matching server 106 can determine that at least the subgroup of content-presentation devices detected first mismatches, such as by receiving notifications from each such content-presentation device. In such embodiments, the fingerprint-matching server 106 can determine that at least the subgroup of content-presentation devices that detected the first mismatch make up at least a threshold percentage of the group of content-presentation devices and, in response to this determination, the fingerprint-matching server 106 can perform a third action that facilitates at least the subgroup of content-presentation devices aborting performance of the content-modification operations before the content-modification operations are complete. The threshold percentage can be a value in a range of 90% to 100%, or can be another value outside of that range. In a more specific example, if the fingerprint-matching server 106 determines that at least 99% of the group detected the first mismatch, the fingerprint-matching server 106 can instruct at least the 99% of content-presentation devices to abort their respective content-modification operations before those content-modification operations are complete. In some instances, if the threshold percentage is met or exceeded, the fingerprint-matching server 106 can instruct the entire group of content-presentation devices to abort their respective content-modification operations.

Further, if the fingerprint-matching server 106 receives notifications indicating, or otherwise determines, that less than the threshold percentage (e.g., less than 90%) of the group detected a first mismatch, the fingerprint-matching server 106 can responsively perform an action that facilitates at least the subgroup of content-presentation devices continuing performance of the content-modification operations until the content-modification operations are complete. As a more specific example, if less than 99% of the content-presentation devices in the group detected a first mismatch, the fingerprint-matching server 106 responsively instruct all of the content-presentation devices in the group to continue their respective content-modification operations until those content-modification operations are complete. In some instances, if the number falls below the threshold percentage, the fingerprint-matching server 106 can instruct the entire group of content-presentation devices to continue their respective content-modification operations.

As another example, if 95% of the group of content-presentation devices detected first mismatches (e.g., within one second of the modification start-time), then the fingerprint-matching server 106 can be configured to interpret this as a likely indication that the content distributor (e.g., content programmer) has broadcasted a different content segment instead of the originally-scheduled modifiable content-segment.

Using at least some of the operations described above, the content-modification system 100 can be configured to keep track over time of which content-presentation devices are connected to tuner devices and are likely to be experiencing detected fingerprint mismatches (e.g., first mismatches or second mismatches) due to tuner devices performing content-modification operations at the instruction of an MVPD. For instance, the fingerprint-matching server 106 or other entity of the content-modification system 100 can update the mapping data described above to indicate, for each of a plurality of content-presentation device identifiers, (i) whether the content-presentation device is connected to a tuner device, (ii) a identifier of an MVPD associated with the tuner device, and/or (iii) a frequency at which the content-presentation device detects mismatches due to the tuner device performing content-modification operations. The mapping data can then be used to better inform decisions made by content-presentation devices and/or the fingerprint-matching server 106 as to which actions to perform relative to the content-modification operations and relative to future content-modification operations.

As an example, the frequency at which a plurality of content-presentation devices detects mismatches due to the tuner device performing content-modification operations can be used to determine or adjust the threshold percentages noted above. For example, if 80 of 100 content-presentation devices detect mismatches and the fingerprint-matching server 106 determines that 70 of those 80 content-presentation devices frequently detect mismatches due to tuner devices performing content-modification operations, the fingerprint-matching server 106 cam determine (or adjust) the threshold percentage to be 70%. Other examples are possible as well.

Figure 6:
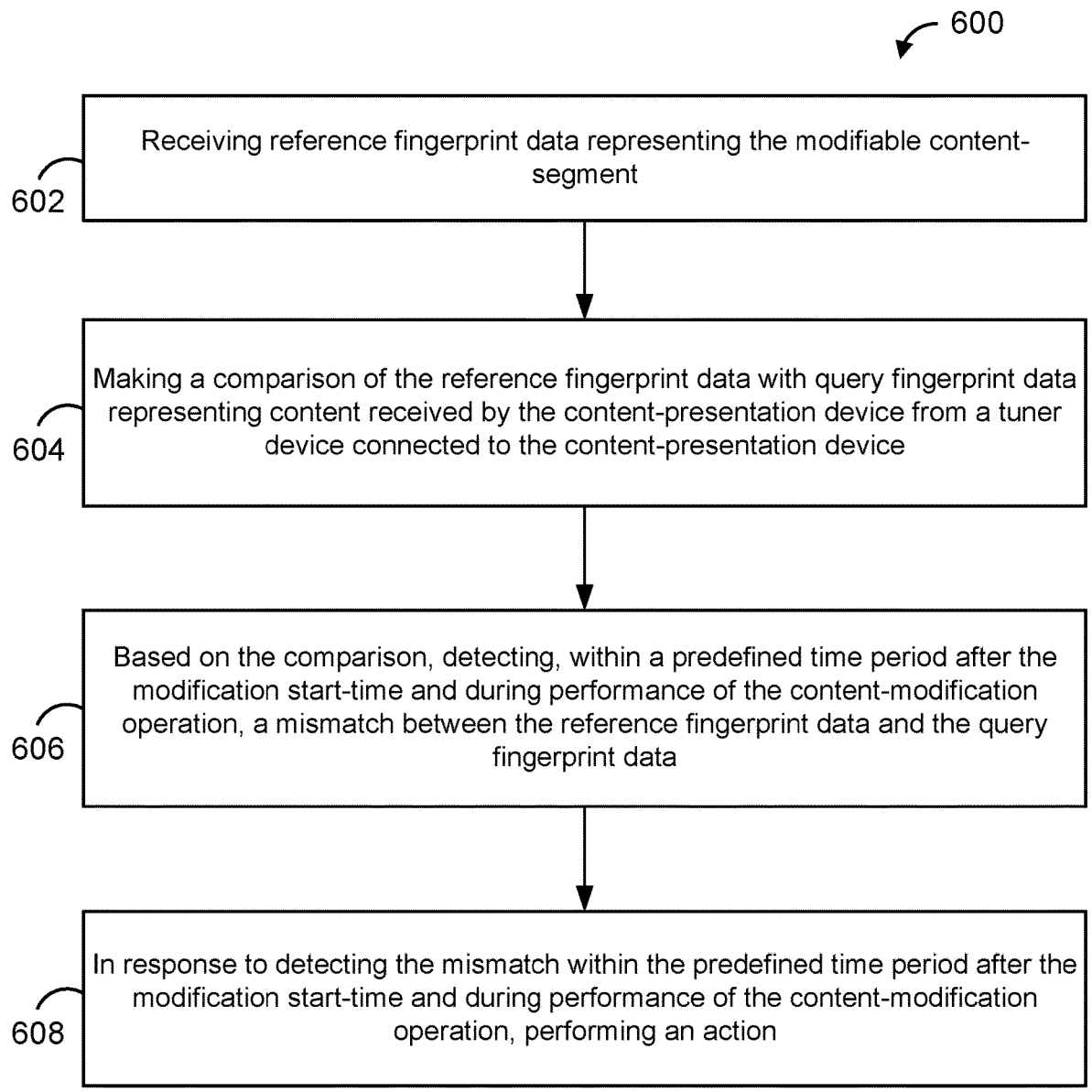
FIG. 6 is a flow chart of an example method.

FIG. 6 is a flow chart of an example method 600. As discussed above, the method 600 is performed by a content-presentation device (e.g., content-presentation device 104) that is scheduled to perform, at a modification start-time, a content-modification operation that comprises modifying a modifiable content-segment that the content-presentation device is scheduled to receive.

At block 602, the method 600 includes receiving reference fingerprint data representing the modifiable content-segment.

At block 604, the method 600 includes making a comparison of the reference fingerprint data with query fingerprint data representing content received by the content-presentation device from a tuner device connected to the content-presentation device.

At block 606, the method 600 includes based on the comparison, detecting, within a predefined time period after the modification start-time and during performance of the content-modification operation, a mismatch between the reference fingerprint data and the query fingerprint data.

At block 608, the method 600 includes in response to detecting the mismatch within the predefined time period after the modification start-time and during performance of the content-modification operation, performing an action.

In some embodiments, the content-presentation device can be part of a content-modification system, and the tuner device can be a STB that is not part of the content-modification system and that is associated with a MVPD.

In some embodiments, the predefined time period can be a value in a range of 1 to 4 seconds.

In some embodiments, the act of performing the action can involve continuing performance of the content-modification operation until the content-modification operation is complete.

In some embodiments, the act of performing the action can involve transmitting, to a fingerprint-matching server, a notification that the content-presentation device has detected the mismatch within the predefined time period after the modification start-time and during performance of the content-modification operation, to facilitate the fingerprint-matching server determining that the mismatch is due to the tuner device having modified the modifiable content-segment before the modification start-time.

In some embodiments, the content-modification operation can be scheduled to be performed relative to an identified content-modification opportunity on a channel to which the content-presentation device is tuned, and the act of performing the action can involve transmitting, to a fingerprint-matching server, an indication that the content-presentation device is receiving content on the channel.

In some embodiments, performing the action can involve aborting the content-modification operation before the content-modification operation is complete.

In some embodiments, the method 600 can also include determining, within the predefined time period after the modification start-time and during performance of the content-modification operation, that at least a portion of the content that was received by the content-presentation device from the tuner device and that is being modified as part of the content-modification operation includes a watermark associated with a content distributor. In such embodiments, the act of performing the action can be performed further in response to determining that at least the portion of the content that was received by the content-presentation device from the tuner device and that is being modified as part of the content-modification operation includes the watermark associated with the content distributor.

In some embodiments, the content-modification operation can be a content-replacement operation that involves replacing the modifiable content-segment with first supplemental content, and the query fingerprint data can represent second supplemental content with which the tuner device replaced the modifiable content-segment before the modification start-time.

Figure 7:
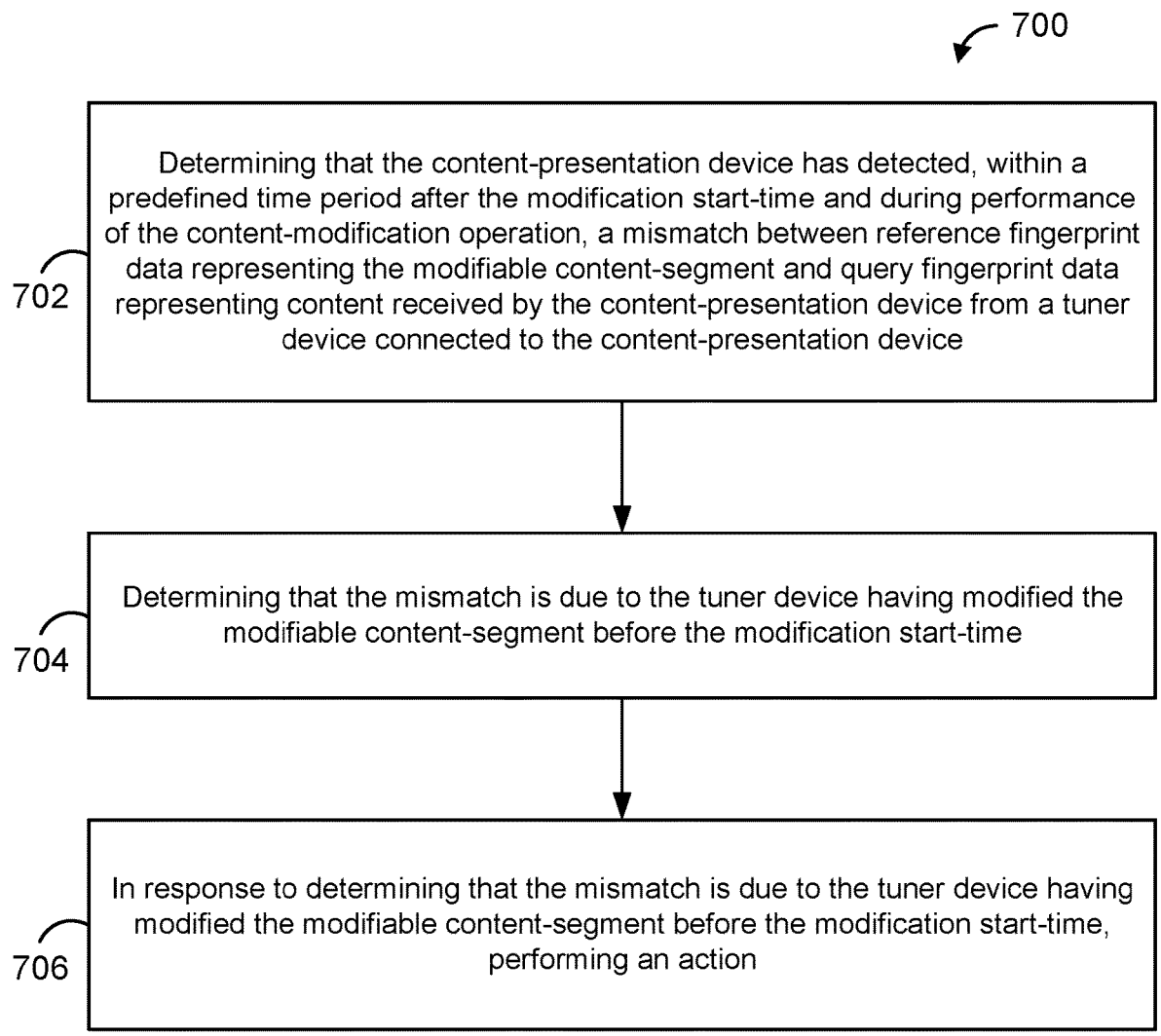
FIG. 7 is a flow chart of an example method.

FIG. 7 is a flow chart of another example method 700. As discussed above, the method 700 is performed by a computing system (e.g., a fingerprint-matching server 106) that is in communication with a content-presentation device (e.g., content-presentation device 104), where the content-presentation device is scheduled to perform, at a modification start-time, a content-modification operation that comprises modifying a modifiable content-segment that the content-presentation device is scheduled to receive.

At block 702, the method 700 includes determining that the content-presentation device has detected, within a predefined time period after the modification start-time and during performance of the content-modification operation, a mismatch between reference fingerprint data representing the modifiable content-segment and query fingerprint data representing content received by the content-presentation device from a tuner device connected to the content-presentation device.

At block 704, the method 700 includes determining that the mismatch is due to the tuner device having modified the modifiable content-segment before the modification start-time.

At block 706, the method 700 includes in response to determining that the mismatch is due to the tuner device having modified the modifiable content-segment before the modification start-time, performing an action.

In some embodiments, the computing system and the content-presentation device can be are part of a content-modification system, and the tuner device can be a STB that is not part of the content-modification system and that is associated with a MVPD.

In some embodiments, the predefined time period can be a value in a range of 1 to 4 seconds.

In some embodiments, the method 700 can also include receiving a list of modifiable content-segments that have been made available to a content distributor, and determining that the list of modifiable content-segments includes the modifiable content-segment. In such embodiments, the act of performing the action can be performed further in response to determining that the list of modifiable content-segments includes the modifiable content-segment.

In some embodiments, the act of performing the action can involve storing an indication that the mismatch is due to the tuner device having modified the modifiable content-segment responsive to an instruction from a content distributor.

In some embodiments, the method 700 can also include identifying a content-modification opportunity on a channel to which the content-presentation device is tuned. In such embodiments, the content-modification operation can be scheduled to be performed relative to the identified content-modification opportunity, and the act of performing the action can involve updating historical content consumption data associated with the content-presentation device to indicate that the content-presentation device is receiving content on the channel and has not changed channels.

In some embodiments, the act of performing the action can involve one or more of: updating a counter representing a total number of content-presentation devices that are connected to tuner devices, or adding a device identifier associated with the content-presentation device to a list of the total number of content-presentation devices that are connected to tuner devices.

In some embodiments, the act of performing the action can involve performing an action that facilitates the content-presentation device continuing performance of the content-modification operation until the content-modification operation is complete.

In some embodiments, the act of performing the action can involve performing an action that facilitates the content-presentation device aborting performance of the content-modification operation before the content-modification operation is complete.

In some embodiments, the content-modification operation can be a content-replacement operation that involves replacing the modifiable content-segment with first supplemental content, and the query fingerprint data can represent second supplemental content with which the tuner device replaced the modifiable content-segment before the modification start-time.

Figure 8:
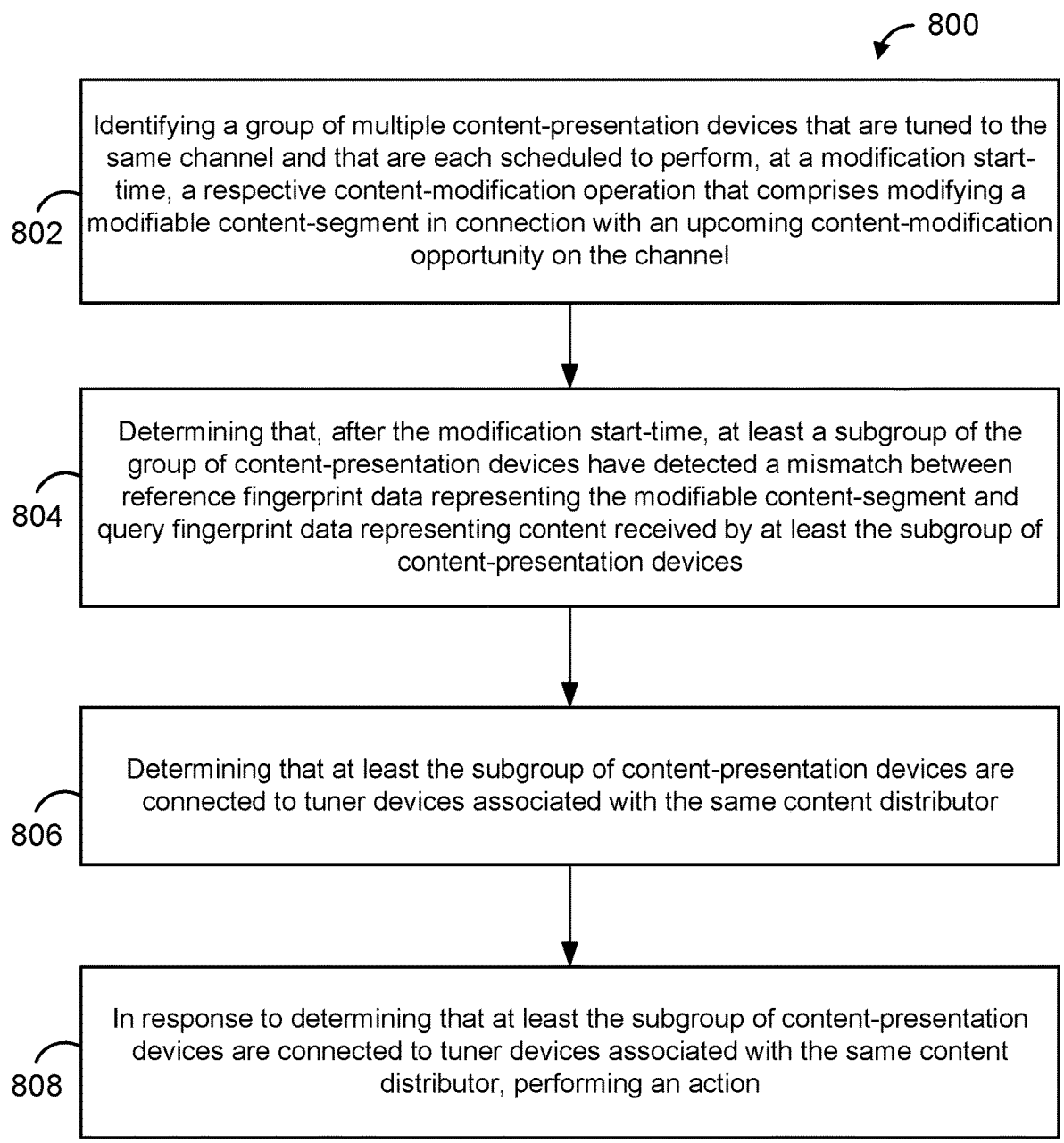
FIG. 8 is a flow chart of an example method.

FIG. 8 is a flow chart of another example method 800. As discussed above, the method 800 can be performed by a computing system (e.g., a fingerprint-matching server 106, content-management system 108, etc.) that is in communication with a content-presentation device (e.g., content-presentation device 104).

At block 802, the method 800 includes identifying a group of multiple content-presentation devices that are tuned to the same channel and that are each scheduled to perform, at a modification start-time, a respective content-modification operation that comprises modifying a modifiable content-segment in connection with an upcoming content-modification opportunity on the channel.

At block 804, the method 800 includes determining that, after the modification start-time, at least a subgroup of the group of content-presentation devices have detected a mismatch between reference fingerprint data representing the modifiable content-segment and query fingerprint data representing content received by at least the subgroup of content-presentation devices.

At block 806, the method 800 includes determining that at least the subgroup of content-presentation devices are connected to tuner devices associated with the same content distributor.

At block 808, the method 800 includes in response to determining that at least the subgroup of content-presentation devices are connected to tuner devices associated with the same content distributor, performing an action.

In some embodiments, the group of content-presentation devices can be part of a content-modification system, at least one of the tuner devices can be a STB that is not part of the content-modification system, and the content distributor can be a MVPD.

In some embodiments, the method 800 can also include determining that at least the subgroup of content-presentation devices are located within the same geographic area associated with the content distributor. In such embodiments, the act of performing the action can be performed further in response to determining that at least the subgroup of content-presentation devices are located within the same geographic area associated with the content distributor.

In some embodiments, the act of determining that at least the subgroup of content-presentation devices are connected to tuner devices associated with the same content distributor can involve for each content-presentation device of at least the subgroup of content-presentation devices: receiving ACR data that represents content received by the content-presentation device from a respective one of the tuner devices and that identifies the content distributor, and detecting a match between at least a portion of the ACR data and one or more of: a channel lineup associated with the content distributor, or one or more static user interface elements associated with the content distributor. In such embodiments, the one or more static user interface elements can include one or more of a logo, a menu layout, a television guide layout, or a boot-up screen for the respective one of the tuner devices.

In some embodiments, the act of determining that at least the subgroup of content-presentation devices are connected to tuner devices associated with the same content distributor can involve for each content-presentation device of at least the subgroup of content-presentation devices: determining, based on historical content consumption data associated with the content-presentation device, a set of one or more channels on which the content-presentation device has received content, and determining that the set of channels matches at least a portion of a channel lineup associated with the content distributor.

In some embodiments, the act of performing the action can involve updating historical content consumption data associated with at least the subgroup of content-presentation devices to indicate that at least the subgroup of content-presentation devices are receiving content on the channel and have not changed channels.

In some embodiments, the act of performing the action can involve performing an action that facilitates at least the subgroup of content-presentation devices continuing performance of the content-modification operations until the content-modification operations are complete.

In some embodiments, the act of performing the action can involve performing an action that facilitates at least the subgroup of content-presentation devices aborting performance of the content-modification operations before the content-modification operations are complete.

In some embodiments, the method 800 can also include determining that at least the subgroup of content-presentation devices that detected the mismatch make up at least a threshold percentage of the group of content-presentation devices. In such embodiments, the act of performing the action can be performed further in response to determining that at least the subgroup of content-presentation devices that detected the mismatch make up at least the threshold percentage of the group of content-presentation devices and comprises performing an action that facilitates at least the subgroup of content-presentation devices aborting performance of the content-modification operations before the content-modification operations are complete.

In some embodiments, the method 800 can also include determining that at least the subgroup of content-presentation devices that detected the mismatch make up less than a threshold percentage of the group of content-presentation devices.

In such embodiments, the act of performing the action can be performed further in response to determining that at least the subgroup of content-presentation devices that detected the mismatch make up less than the threshold percentage of the group of content-presentation devices and comprises performing an action that facilitates at least the subgroup of content-presentation devices continuing performance of the content-modification operations until the content-modification operations are complete.

In some embodiments, the content-modification operations can be content-replacement operations that comprise replacing the modifiable content-segment with respective first supplemental content, and the query fingerprint data can represent second supplemental content with which the tuner devices replaced the modifiable content-segment before the modification start-time.

IV. Example Variations

Although the examples and features described above have been described in connection with specific entities and specific operations, in practice, there are likely to be many instances of these entities and many instances of these operations being performed, perhaps contemporaneously or simultaneously, on a large-scale basis. Indeed, in practice, the content-modification system 100 is likely to include many content-distribution systems (each potentially transmitting content on many channels) and many content-presentation devices, with some or all of the described operations being performed on a routine and repeating basis in connection with some or all of these entities.

In addition, although some of the operations described in this disclosure have been described as being performed by a particular entity, the operations can be performed by any entity, such as the other entities described in this disclosure. Further, although the operations have been recited in a particular order and/or in connection with example temporal language, the operations need not be performed in the order recited and need not be performed in accordance with any particular temporal restrictions. However, in some instances, it can be desired to perform one or more of the operations in the order recited, in another order, and/or in a manner where at least some of the operations are performed contemporaneously/simultaneously. Likewise, in some instances, it can be desired to perform one or more of the operations in accordance with one more or the recited temporal restrictions or with other timing restrictions. Further, each of the described operations can be performed responsive to performance of one or more of the other described operations. Also, not all of the operations need to be performed to achieve one or more of the benefits provided by the disclosure, and therefore not all of the operations are required.

Although certain variations have been described in connection with one or more examples of this disclosure, these variations can also be applied to some or all of the other examples of this disclosure as well and therefore aspects of this disclosure can be combined and/or arranged in many ways. The examples described in this disclosure were selected at least in part because they help explain the practical application of the various described features.

Also, although select examples of this disclosure have been described, alterations and permutations of these examples will be apparent to those of ordinary skill in the art. Other changes, substitutions, and/or alterations are also possible without departing from the invention in its broader aspects as set forth in the following claims.

What is claimed is:

1. A method comprising:
   determining that a group of multiple content-presentation devices are tuned to a same channel and that each content-presentation device of the group of content-presentation devices is scheduled to perform, at a modification start-time, a respective content-modification operation that comprises modifying a modifiable content-segment in connection with an upcoming content-modification opportunity on the channel;
   determining that, after the modification start-time, at least a subgroup of the group of content-presentation devices have detected a mismatch between reference fingerprint data representing the modifiable content-segment and query fingerprint data representing content received by at least the subgroup of content-presentation devices;
   determining that at least the subgroup of content-presentation devices are connected to tuner devices associated with a same content distributor; and
   in response to determining that, after the modification start-time, at least the subgroup of content-presentation devices have detected the mismatch between the reference fingerprint data representing the modifiable content-segment and the query fingerprint data representing content received by at least the subgroup of content-presentation devices, and further in response to determining that at least the subgroup of content-presentation devices are connected to tuner devices associated with the content distributor, performing an action comprising updating historical content consumption data associated with at least the subgroup of content-presentation devices to indicate that at least the subgroup of content-presentation devices are receiving content on the same channel and have not changed channels.

2. The method of claim 1, wherein performing the action comprises:

performing the action in response to a determination that the modifiable content-segment that the group of content-presentation devices is scheduled to modify is one of a list of modifiable content-segments that have been made available to a multi-channel video program distributor (MVPD) or another content distributor.

3. The method of claim 1, wherein the group of content-presentation devices are part of a content-modification system, wherein at least one of the tuner devices is a set-top box (STB) that is not part of the content-modification system, wherein each content-presentation device of the subgroup of content-presentation devices belongs to a respective household, wherein each content-presentation device of the subgroup of content-presentation devices is connected to a respective tuner device of the tuner devices, wherein the respective tuner device belongs to the respective household, and wherein the content distributor is a multi-channel video program distributor (MVPD).

4. The method of claim 1, further comprising:

determining that at least the subgroup of content-presentation devices are located within the same geographic area associated with the content distributor, wherein performing the action is performed further in response to determining that at least the subgroup of content-presentation devices are located within the same geographic area associated with the content distributor.

5. The method of claim 1, wherein determining that at least the subgroup of content-presentation devices are connected to tuner devices associated with the same content distributor comprises:

for each content-presentation device of at least the subgroup of content-presentation devices:

receiving automatic content recognition (ACR) data that represents content received by the content-presentation device from a respective one of the tuner devices and that identifies the content distributor, and detecting a match between at least a portion of the ACR data and one or more of:

a channel lineup associated with the content distributor, or one or more static user interface elements associated with the content distributor.

6. The method of claim 1, wherein determining that at least the subgroup of content-presentation devices are connected to tuner devices associated with the same content distributor comprises:

for each content-presentation device of at least the subgroup of content-presentation devices:

determining, based on historical content consumption data associated with the content-presentation device, a set of one or more channels on which the content-presentation device has received content, and determining that the set of one or more channels matches at least a portion of a channel lineup associated with the content distributor.

7. The method of claim 1, wherein determining that, after the modification start-time, at least the subgroup of the group of content-presentation devices have detected a mismatch between reference fingerprint data representing the modifiable content-segment and query fingerprint data representing content received by at least the subgroup of content-presentation devices comprises:

receiving, from each content-presentation device of at least the subgroup of content-presentation devices, a notification indicating that the content-presentation device detected the mismatch within a predefined time period after the modification start-time and during performance of the content-modification operation, wherein the predefined time period after the modification start-time represents a time period during which a detected mismatch between reference fingerprint data and query fingerprint data is expected to be caused by a tuner device to which the content-presentation device is connected having already modified the modifiable content-segment before the modification start-time.

8. A non-transitory computer-readable storage medium, having stored thereon program instructions that, upon execution by a processor, cause performance of a set of operations comprising:

determining that a group of multiple content-presentation devices are tuned to a same channel and that each content-presentation device of the group of content-presentation devices is scheduled to perform, at a modification start-time, a respective content-modification operation that comprises modifying a modifiable content-segment in connection with an upcoming content-modification opportunity on the channel;

determining that, after the modification start-time, at least a subgroup of the group of content-presentation devices have detected a mismatch between reference fingerprint data representing the modifiable content-segment and query fingerprint data representing content received by at least the subgroup of content-presentation devices;

determining that at least the subgroup of content-presentation devices are connected to tuner devices associated with a same content distributor; and in response to determining that, after the modification start-time, at least the subgroup of content-presentation devices have detected the mismatch between the reference fingerprint data representing the modifiable content-segment and the query fingerprint data representing content received by at least the subgroup of content-presentation devices, and further in response to determining that at least the subgroup of content-presentation devices are connected to tuner devices associated with the content distributor, performing an action comprising updating historical content consumption data associated with at least the subgroup of content-presentation devices to indicate that at least the subgroup of content-presentation devices are receiving content on the same channel and have not changed channels.

9. The non-transitory computer-readable storage medium of claim 8, wherein performing the action comprises:

performing the action in response to a determination that the modifiable content-segment that the group of content-presentation devices is scheduled to modify is one of a list of modifiable content-segments that have been made available to a multi-channel video program distributor (MVPD) or another content distributor.

10. The non-transitory computer-readable storage medium of claim 8, wherein the group of content-presentation devices are part of a content-modification system,
   wherein at least one of the tuner devices is a set-top box (STB) that is not part of the content-modification system, and
   wherein the content distributor is a multi-channel video program distributor (MVPD).

11. The non-transitory computer-readable storage medium of claim 8, the operations further comprising:
   determining that at least the subgroup of content-presentation devices are located within the same geographic area associated with the content distributor,
   wherein performing the action is performed further in response to determining that at least the subgroup of content-presentation devices are located within the same geographic area associated with the content distributor.

12. The non-transitory computer-readable storage medium of claim 8, wherein determining that at least the subgroup of content-presentation devices are connected to tuner devices associated with the same content distributor comprises:
   for each content-presentation device of at least the subgroup of content-presentation devices:
      receiving automatic content recognition (ACR) data that represents content received by the content-presentation device from a respective one of the tuner devices and that identifies the content distributor, and
      detecting a match between at least a portion of the ACR data and one or more of:
         a channel lineup associated with the content distributor, or
         one or more static user interface elements associated with the content distributor.

13. The non-transitory computer-readable storage medium of claim 8, wherein determining that at least the subgroup of content-presentation devices are connected to tuner devices associated with the same content distributor comprises:
   for each content-presentation device of at least the subgroup of content-presentation devices:
      determining, based on historical content consumption data associated with the content-presentation device, a set of one or more channels on which the content-presentation device has received content, and
      determining that the set of one or more channels matches at least a portion of a channel lineup associated with the content distributor.

14. The non-transitory computer-readable storage medium of claim 8, wherein determining that at least the subgroup of content-presentation devices are connected to tuner devices associated with the same content distributor comprises:
   for each content-presentation device of at least the subgroup of content-presentation devices:
      determining, based on historical content consumption data associated with the content-presentation device, a set of one or more channels on which the content-presentation device has received content, and
      determining that the set of one or more channels matches at least a portion of a channel lineup associated with the content distributor.

15. The non-transitory computer-readable storage medium of claim 8, wherein determining that, after the modification start-time, at least the subgroup of the group of content-presentation devices have detected a mismatch between reference fingerprint data representing the modifiable content-segment and query fingerprint data representing content received by at least the subgroup of content-presentation devices comprises:
   receiving, from each content-presentation device of at least the subgroup of content-presentation devices, a notification indicating that the content-presentation device detected the mismatch within a predefined time period after the modification start-time and during performance of the content-modification operation,
   wherein the predefined time period after the modification start-time represents a time period during which a detected mismatch between reference fingerprint data and query fingerprint data is expected to be caused by a tuner device to which the content-presentation device is connected having already modified the modifiable content-segment before the modification start-time.

16. A computing system comprising:
   a processor; and
   a non-transitory computer-readable storage medium, having stored thereon program instructions that, upon execution by the processor, cause performance of a set of operations comprising:
      determining that a group of multiple content-presentation devices are tuned to a same channel and that each content-presentation device of the group of content-presentation devices is scheduled to perform, at a modification start-time, a respective content-modification operation that comprises modifying a modifiable content-segment in connection with an upcoming content-modification opportunity on the channel;
      determining that, after the modification start-time, at least a subgroup of the group of content-presentation devices have detected a mismatch between reference fingerprint data representing the modifiable content-segment and query fingerprint data representing content received by at least the subgroup of content-presentation devices;
      determining that at least the subgroup of content-presentation devices are connected to tuner devices associated with a same content distributor; and
      in response to determining that, after the modification start-time, at least the subgroup of content-presentation devices have detected the mismatch between the reference fingerprint data representing the modifiable content-segment and the query fingerprint data representing content received by at least the subgroup of content-presentation devices, and further in response to determining that at least the subgroup of content-presentation devices are connected to tuner devices associated with the content distributor, performing an action comprising updating historical content consumption data associated with at least the subgroup of content-presentation devices to indicate that at least the subgroup of content-presentation devices are receiving content on the same channel and have not changed channels.

17. The computing system of claim 16, wherein performing the action comprises:
   performing the action in response to a determination that the modifiable content-segment that the group of content-presentation devices is scheduled to modify is one of a list of modifiable content-segments that have been made available to a multi-channel video program distributor (MVPD) or another content distributor.

18. The computing system of claim 16, wherein the group of content-presentation devices are part of a content-modification system,
    wherein at least one of the tuner devices is a set-top box (STB) that is not part of the content-modification system,
    wherein each content-presentation device of the subgroup of content-presentation devices belongs to a respective household,
    wherein each content-presentation device of the subgroup of content-presentation devices is connected to a respective tuner device of the tuner devices,
    wherein the respective tuner device belongs to the respective household, and
    wherein the content distributor is a multi-channel video program distributor (MVPD).

19. The computing system of claim 16, wherein the set of operations further comprise:
    determining that at least the subgroup of content-presentation devices are located within the same geographic area associated with the content distributor,
    wherein performing the action is performed further in response to determining that at least the subgroup of content-presentation devices are located within the same geographic area associated with the content distributor.

20. The computing system of claim 16, wherein determining that at least the subgroup of content-presentation devices are connected to tuner devices associated with the same content distributor comprises:
    for each content-presentation device of at least the subgroup of content-presentation devices:
        receiving automatic content recognition (ACR) data that represents content received by the content-presentation device from a respective one of the tuner devices and that identifies the content distributor, and
        detecting a match between at least a portion of the ACR data and one or more of:
            a channel lineup associated with the content distributor, or
            one or more static user interface elements associated with the content distributor.

\* \* \* \* \*